(12) United States Patent
Guzman de Villoria et al.

(10) Patent No.: US 9,663,368 B2
(45) Date of Patent: May 30, 2017

(54) CARBON-BASED NANOSTRUCTURE FORMATION USING LARGE SCALE ACTIVE GROWTH STRUCTURES

(75) Inventors: Roberto Guzman de Villoria, Cambridge, MA (US); Brian L. Wardle, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 898 days.

(21) Appl. No.: 13/284,021

(22) Filed: Oct. 28, 2011

(65) Prior Publication Data

US 2012/0135224 A1 May 31, 2012

Related U.S. Application Data

(60) Provisional application No. 61/407,776, filed on Oct. 28, 2010.

(51) Int. Cl.
*C01B 31/02* (2006.01)
*B82Y 30/00* (2011.01)
*B82Y 40/00* (2011.01)

(52) U.S. Cl.
CPC .......... *C01B 31/0233* (2013.01); *B82Y 30/00* (2013.01); *B82Y 40/00* (2013.01); *Y10T 428/25* (2015.01)

(58) Field of Classification Search
CPC ............ C01B 31/0438; C01B 31/0226; C01B 31/0233; C01B 31/02; C01B 31/0206;
(Continued)

(56) References Cited

U.S. PATENT DOCUMENTS

| 3,574,076 A | 4/1971 | Kirsch |
| 4,149,866 A | 4/1979 | Austin et al. |

(Continued)

FOREIGN PATENT DOCUMENTS

| JP | H08133716 A | 5/1996 |
| JP | 2002-121015 A2 | 4/2002 |

(Continued)

OTHER PUBLICATIONS

Machine english translation of JP2005-279624A.*
(Continued)

*Primary Examiner* — Richard M Rump
(74) *Attorney, Agent, or Firm* — Wolf, Greenfield & Sacks, P.C.

(57) ABSTRACT

Systems and methods for the formation of carbon-based nanostructures using large-scale active growth structures are generally described. In addition, systems and methods related to the formation of carbon-based nanostructures using basalt and/or titanium (e.g., elemental titanium) are generally described. The carbon-based nanostructures can be grown by exposing the large-scale active growth structures, basalt, and/or titanium to a set of conditions selected to cause formation of carbon-based nanostructures on (e.g., directly on) the large-scale active growth structure, basalt, and/or titanium. When basalt and/or titanium are used as all or part of an active growth structure, the basalt and/or titanium can be in any suitable form such as, for example, a planar or non-planar active growth structure (which can have, in some cases, a first cross-sectional dimension of at least about 1 mm) comprising basalt and/or titanium (e.g., a fiber comprising basalt and/or titanium) and/or particles (e.g., nanoparticles) comprising basalt and/or titanium.

60 Claims, 11 Drawing Sheets

(58) Field of Classification Search
CPC .............. C01B 31/0213; C01B 31/022; C01B 31/0293
USPC ....... 423/447.1, 447.3, 445 B; 977/742, 842, 977/843
See application file for complete search history.

(56) References Cited

U.S. PATENT DOCUMENTS

| | | |
|---|---|---|
| 4,199,336 A | 4/1980 | Rittler |
| 4,560,606 A | 12/1985 | Rapp et al. |
| 6,045,769 A | 4/2000 | Kambe et al. |
| 6,331,690 B1 | 12/2001 | Yudasaka et al. |
| 7,001,857 B2 | 2/2006 | Degroote |
| 7,014,737 B2 | 3/2006 | Harutyunyan et al. |
| 7,052,668 B2 | 5/2006 | Smalley et al. |
| 7,459,013 B2 | 12/2008 | Holmes et al. |
| 7,537,825 B1 | 5/2009 | Wardle et al. |
| 7,687,146 B1 | 3/2010 | Freitas et al. |
| 7,754,054 B2 | 7/2010 | Mitra et al. |
| 8,171,568 B2 | 5/2012 | Freitas et al. |
| 8,257,678 B2 | 9/2012 | Steiner et al. |
| 8,318,386 B2 | 11/2012 | Kobrin |
| 8,376,013 B2 | 2/2013 | Bourke et al. |
| 8,545,791 B2 | 10/2013 | Plata et al. |
| 8,865,109 B2 | 10/2014 | Steiner et al. |
| 2002/0102203 A1 | 8/2002 | Smalley et al. |
| 2003/0203205 A1 | 10/2003 | Bi et al. |
| 2004/0222081 A1 | 11/2004 | Tour et al. |
| 2005/0025696 A1 | 2/2005 | Resasco et al. |
| 2005/0170089 A1 | 8/2005 | Lashmore et al. |
| 2005/0260119 A1 | 11/2005 | Sunkara et al. |
| 2006/0025304 A1 | 2/2006 | Wang et al. |
| 2006/0237301 A1 | 10/2006 | Azami et al. |
| 2006/0241237 A1 | 10/2006 | Drzal et al. |
| 2007/0042903 A1 | 2/2007 | Huang et al. |
| 2007/0090489 A1 | 4/2007 | Hart et al. |
| 2007/0218202 A1 | 9/2007 | Ajayan et al. |
| 2007/0258881 A1 | 11/2007 | Kambara et al. |
| 2008/0075954 A1 | 3/2008 | Wardle et al. |
| 2008/0154431 A1 | 6/2008 | Defries et al. |
| 2008/0187648 A1 | 8/2008 | Hart et al. |
| 2008/0210542 A1 | 9/2008 | Maekawa et al. |
| 2008/0241047 A1 | 10/2008 | Asano |
| 2009/0008610 A1 | 1/2009 | Bordere et al. |
| 2009/0056802 A1 | 3/2009 | Rabani |
| 2009/0117363 A1 | 5/2009 | Wardle et al. |
| 2009/0196993 A1 | 8/2009 | Iijima et al. |
| 2009/0291352 A1 | 11/2009 | Oshihara et al. |
| 2009/0311166 A1 | 12/2009 | Hart et al. |
| 2010/0192851 A1 | 8/2010 | Shah et al. |
| 2010/0196695 A1 | 8/2010 | Garcia et al. |
| 2010/0255303 A1 | 10/2010 | Wardle et al. |
| 2010/0266964 A1 | 10/2010 | Gilje |
| 2010/0276072 A1 | 11/2010 | Shah et al. |
| 2010/0279569 A1 | 11/2010 | Shah et al. |
| 2011/0027162 A1 | 2/2011 | Steiner, III et al. |
| 2011/0111577 A1 | 5/2011 | Choi et al. |
| 2011/0142091 A1 | 6/2011 | Wardle et al. |
| 2011/0162957 A1 | 7/2011 | Wardle et al. |
| 2012/0014854 A1 | 1/2012 | Fehrmann et al. |
| 2012/0135224 A1 | 5/2012 | Guzman De Villoria et al. |
| 2012/0164903 A1 | 6/2012 | Wardle et al. |
| 2013/0072077 A1 | 3/2013 | Steiner, III et al. |
| 2015/0071849 A1 | 3/2015 | Steiner et al. |

FOREIGN PATENT DOCUMENTS

| | | |
|---|---|---|
| JP | 2003-171108 A2 | 6/2003 |
| JP | 2004-324004 A | 11/2004 |
| JP | 2005-279624 A | 10/2005 |
| JP | 2005279624 A * | 10/2005 |
| JP | 2006-231247 A2 | 9/2006 |
| JP | 2008-133716 A2 | 6/2008 |
| JP | 2009-538809 T2 | 11/2009 |
| JP | 2010-504268 T2 | 2/2010 |
| WO | WO 01/47826 A1 | 7/2001 |
| WO | WO 2006/096964 A1 | 9/2006 |
| WO | WO 2007/088829 A1 | 8/2007 |
| WO | WO 2007/136755 | 11/2007 |
| WO | WO 2007/139038 A1 | 12/2007 |
| WO | WO 2008/034204 A2 | 3/2008 |
| WO | WO 2008/054541 A2 | 5/2008 |
| WO | WO 2008/057620 A2 | 5/2008 |
| WO | WO 2008/100325 A2 | 8/2008 |
| WO | WO 2009/029218 | 3/2009 |
| WO | WO 2010/120273 A2 | 10/2010 |
| WO | WO 2011/014258 A2 | 2/2011 |
| WO | WO 2012/091789 A1 | 7/2012 |

OTHER PUBLICATIONS

Chemical Vapor Deposiiton. Wikipedia. <http://en.wikipedia.org/Chemical_Vapor_Deposition> Accessed Mar. 5, 2015.*

Su, Dang Sheng, and Xiao-Wei Chen. "Natural lavas as catalysts for efficient production of carbon nanotubes and nanofibers." Angewandte Chemie International Edition 46.11 (2007): 1823-1824.*

Talapatra, S., et al. "Direct growth of aligned carbon nanotubes on bulk metals." Nature nanotechnology 1.2 (2006): 112-116.*

Chhowalla, M., et al. "Growth process conditions of vertically aligned carbon nanotubes using plasma enhanced chemical vapor deposition." Journal of Applied Physics 90.10 (2001): 5308-5317.*

Yang, Q., et al. "Simultaneous growth of diamond thin films and carbon nanotubes at temperatures< 550° C." Carbon 46.4 (2008): 589-595.*

Huang, J. N., et al. "Nano Effects of Helium Plasma Treatment Carbon Nanotubes Coating Basalt Filament." Materials Science Forum. vol. 610. Trans Tech Publications, 2009.*

"Basalt Chopped Fiber Strands." Basalt Gold Co. LTD. <http://www.basaltfiber-gbf.com/basalt-chopped-strands-supplier.html> Accessed Jun. 27, 2016.*

Su, Dang Sheng, et al. "Nanocarbons: efficient synthesis using natural lava as supported catalyst." physica status solidi (b) 244.11 (2007): 3916-3919.*

Karwa, Mahesh, Zafar Iqbal, and Somenath Mitra. "Scaled-up self-assembly of carbon nanotubes inside long stainless steel tubing." Carbon 44.7 (2006): 1235-1242.*

International Search Report and Written Opinion for Application No. PCT/US2011/058300 mailed May 9, 2012.

International Preliminary Report on Patentability for Application No. PCT/US2011/058300 mailed May 10, 2013.

[No Author Listed] Carbon enhanced reinforcements: A new class of engineered materials. Owen Corning: Innovations for Living. 1 page. Accessed Nov. 2, 2011.

Cao et al., Multifunctional brushes made from carbon nanotubes. Nat Mater. Jul. 2005;4(7):540-5. Epub Jun. 12, 2005.

Ci et al., Direct growth of carbon nanotubes on the surface of ceramic fibers. Carbon. 2005;43(4):883-6.

De Villoria et al., Continuous high-yield production of vertically aligned carbon nanotubes on 2D and 3D substrates. American Chemical Society. 2011;5(6):4850-7. Supporting Information included. 11 pages.

Derycke et al., Catalyst-free growth of ordered single-walled carbon nanotube networks. Nano Letters. Oct. 10, 2002;2(10):1043-6.

Drobot et al., Study of basalts by local x-ray spectrum analysis. Inorganic Materials. 2009;45(3):281-6.

Garcia et al., (Student Paper) Fabrication and testing of long carbon nanotubes grown on the surface of fibers for hybrid composites. 47th AIAA/ASME/ASCE/AHS/ASC Structures, Structural Dynamics, and Materials Conference. May 1-4, 2006. Newport, RI. 11 pages.

Garcia et al., Fabrication and multifunctional properties of a hybrid laminate with aligned carbon nanotubes grown In Situ. Composites Sci and Technol. Mar. 2008;68:2034-41.

Gutnikov et al., Influence of alumina on the properties of continuous basalt fibers. Russian Journal of Inorganic Chemistry. 2009;54(2):191-6.

(56) References Cited

OTHER PUBLICATIONS

Hart et al., Growth of conformal single-walled carbon nanotube films from Mo/Fe/Al2O3 deposited by electron beam evaporation. Carbon. Aug. 26, 2005; 44:348-59.
Hart et al., Force output, control of film structure, and microscale shape transfer by carbon nanotube growth under mechanical pressure. Nano Lett. Jun. 2006;6(6):1254-60.
Hart et al., Desktop growth of carbon-nanotube monoliths with in situ optical imaging. Small. May 2007;3(5):772-7.
Hart et al., Rapid growth and flow-mediated nucleation of millimeter-scale aligned carbon nanotube structures from a thin-film catalyst. J Phys Chem B. Apr. 27, 2006;110(16):8250-7.
Huang et al., Metal-catalyst-free growth of single-walled carbon nanotubes on substrates. J Am Chem Soc. Feb. 18, 2009;131(6):2094-5.
Karwa et al., Scaled-up self-assembly of carbon nanotubes inside long stainless steel tubing. Carbon. 2006;44:1235-42.
Khan et al., Electrical transport properties of Ni95Ti5 catalyzed multi wall carbon nanotubes film. Journal of Nanomaterials. 2009. 8 pages.
Kis et al., Reinforcement of single-walled carbon nanotube bundles by intertube bridging. Nat Mater. Mar. 2004;3(3):153-7. Epub Feb. 15, 2004.
Kusunoki et al., A formation mechanism of carbon nanotube films on SiC(0001). Applied Physics Letters. Jul. 24, 2000;77(4): 531-3.
Li et al., Preparation of regular coiled carbon nanotubes and their structures. Gaojishu Tongxun. Apr. 1997;7(1):19-21. STN Database Accession No. 194404.
Li et al., The synthesis of single-walled carbon nanotubes over an Al2O3/Fe2O3 binary aerogel catalyst. Journal of Physics: Conference Series. 2006;26:308-11.
Liu et al., Growth of single-walled car bon nanotubes from ceramic particles by alcohol chemical vapor deposition. Applied Physics Express. 2008;1:014001-1-3.
Liu et al., Metal-catalyst-free growth of single-walled carbon nanotubes. J Am Chem Soc. Feb. 18, 2009;131(6):2082-3.
Miao et al., Growth of carbon nanotubes on transition metal alloys by microwave-enhanced hot-filament deposition. Thin Solid Films Jul. 2005;484:58-63.
Moiseev et al., Effect of iron oxides on the fabrication and properties of continuous glass fibers. Inorganic Materials. 2008;44(9):1026-30.
Murakami et al., Direct synthesis of high-quality single-walled carbon nanotubes on silicon and quartz substrates. Chemical Physics Letters. 2003;377:49-54.
Qian et al., Hierarchical Composites Reinforced with Carbon Nanotube Grafted Fibers: The Potential Assessed at the Single Fiber Level. Chemistry of Materials. 2008;20:1862-69.
Rummeli et al., On the graphitization nature of oxides for the formation of carbon nanostructures. Chemistry of Materials. Aug. 21, 2007;19(17):4105-7. Supporting Information included. 4 pages.
Steiner et al., Nanoscale zirconia as a nonmetallic catalyst for graphitization of carbon and growth of single- and multiwall carbon nanotubes. J Am Chem Soc. Sep. 2, 2009;131(34):12144-54.
Takagi et al. Carbon Nanotube Growth from Semiconductor Nanoparticles. Nano Letters. Jul. 2007;7(8):2272-5.
Thostenson et al., Carbon nanotube/carbon fiber hybrid multiscale composites. Journal of Applies Physics. May 2002;91(9):6034-7.
Vander Wal et al., Substrate-support interactions in metal-catalyzed carbon nanofiber growth. Carbon. 2001;39:2277-89.
Veedu et al., Multifunctional composites using reinforced laminae with carbon-nanotube forests. Nat Mater. Jun. 2006;5(6):457-62. Epub May 7, 2006.
Wu et al., Thin-walled carbon nanotubes grown using a zirconium catalyst. Carbon. Jun. 2010;48:1897-1901.
Yamamoto et al., High-yield growth and morphology control of aligned carbon nanotubes on ceramic fibers for multifunctional enhancement of structural composites. Carbon. 2009;47:551-60.
[No Author Listed], Growth of Multiwalled Carbon Nanotubes on Carbon Fabric. Movie. Accessed online on May 25, 2016 at https://smartech.gatech.edu/bitstream/handle/1853/21628/lacasse. mp4?sequence=5. DVD-R enclosed herewith.
Guzman De Villoria et al., Continuous Production of Vertically Aligned Carbon Nanotubes on Alumina Fiber Bundles/Tows. Movie. Available online on May 17, 2011 at http://pubs.acs.org/doi/suppl/10.1021/nn2008645. DVD-R enclosed herewith.
Hartet al., Versatility of the Fe/Al$_2$O$_3$ system for high-yield carbon nanotube growth by thermal CVD of C$_2$H$_4$. NT05: Sixth International Conference on the Science and Application of Nanotubes; Goteborg University, Chalmers University of Technology; and University College of Boras; (Gothenburg, Sweden); Jun. 26-Jul. 1, 2005. Abstract submitted Mar. 28, 2005.
Hart et al., Versatility of the Fe/Al$_2$O$_3$ system for high-yield carbon nanotube growth by thermal CVD of C$_2$H$_4$. NT05: Sixth International Conference on the Science and Application of Nanotubes; Goteborg University, Chalmers University of Technology; and University College of Boras; (Gothenburg, Sweden); Jun. 26-Jul. 1, 2005. Poster.
Lacasse et al., Growth of Multiwalled Carbon Nanotubes on Carbon Fabric. Presentation. Accessed online at https://smartech.gatech.edu/handle/1853/21628. Believed to have been available online in Jun. 2009.
[No Author Listed] Definition of ovipositor. Stedman's Online Medical Dictionary. Http://www.stedmansonline.com/popip. aspx?aid=5222030. Accessed Feb. 21, 2013.
Bachilo, et al., "Narrow (n,m)-Distribution of Single-Walled Carbon Nanotubes Grown Using a Solid Support Catalyst," Journal of the American Chemical Society, 125:11186-11187 (2003).
Balaceanu, et al., "Surface Chemistry of Plasma Deposited ZrC Hard Coatings," Journal of Optoelectronics and Advanced Materials, 7, 2557-2560 (2005).
Barr, "An ESCA Study of the Termination of the Passivation of Elemental Metals," Journal of Physical Chemistry, 82:1801-1810 (1978).
Baumann, et al., "Synthesis and Characterization of Copper-Doped Carbon Aerogels," Langmuir, 18, pp. 7073-7076 (2002).
Bayer et al., Co-catalytic solid-state reduction applied to carbon nanotube growth. J. Phys. Chem. C. 2012; 116 (1): 1107-1113. DOI: 10.1021/jp210137u.
Bensch, et al., "Experimental and Theoretical Bandstructure of the Layer Compound ZrSiTe," J. Phys. Chem., 99, pp. 3326-3330. (1995).
Berger, et al., "On the mechanism of carbothermal reduction processes of TiO$_2$ and ZrO$_2$," International Journal of Refractory Metals and Hard Materials, 17:235-243 (1999).
Bhaviripudi, et al., "CVD Synthesis of Single-Walled Carbon Nanotubes from Gold Nanoparticle Catalysts," Journal of the American Chemical Society, 129:1516-1517 (2007).
Chai et al., The Examination of NiO and CoOx Catalysts Supported on Al2O3 and SiO2 for Carbon Nanotubes Production by Catalytic Chemical Vapor Deposition of Methane. Carbon-Sci Tech 1. Applied Science Innovations Pvt. Ltd., India. 2008. 24-9.
Chung, Y. H., et al., "Carbon nanotubes from catalytic pyrolysis of polypropylene," Materials Chemistry and Physics, vol. 92, No. 1, Jul. 2005, pp. 256-259.
Coleman et al., Small but strong: A review of the mechanical properties of carbon nanotube-polymer composites. Carbon. 2006; 44: 1624-52.
Downs, et al., "Modification of the surface properties of carbon fibers via the catalytic growth of carbon fibers," Journal of Materials Research, 10:625-633 (1995).
Dupuis, "The catalyst in the CCVD of carbon nanotubes—a review," Progress in Materials Science, 50:929 (2005).
Eres et al., Molecular Beam-Controlled Nucleation and Growth of Vertically Aligned Single-Wall Carbon Nanotube Arrays. J Phys Chem B. Sep. 2005; 109(35): 16684-94. DOI: 10.1021/jp051531i.
Esconjauregui, et al., "The reasons why metals catalyze the nucleation and growth of carbon nanotubes and other carbon nanomorphologies," Carbon, 47, pp. 659-669, 2009.
Fan, et al., "Self-Oriented Regular Arrays of Carbon Nanotubes and Their Field Emission Properties," Science, vol. 203, 512-514 Jan. 1999.

(56) References Cited

OTHER PUBLICATIONS

Fang et al., CVD synthesis of CNTs using bimetal catalyst with different atomic ratio supported on ZrO2. Journal Zhejiang University of Technology. Feb. 28, 2005;33(1):88-92.

Farzaneh, et al., Preparation of Carbon Nanotubes by CVD Process over Nanoparticles of Ni-Ce-Zr Mixed Oxides. J Sci Islam Repub Iran. 2008;19(2):119-123.

Ferlauto, A. S., et al. Chemical vapor deposition of multi-walled carbon nanotubes from nickel/yttria-stabilized zirconia catalysts. Applied Physics A.. Aug. 2006;84(3):271-276.

Fouquet et al., Highly chiral-selective growth of single-walled carbon nanotubes with a simple monometallic Co catalyst. Phys. Rev. B. Jun. 6, 2012; 85: 235411.

Freund, "Metal-supported ultrathin oxide film systems as designable catalysts and catalyst supports," Surface Science, 601:1438-1442 (2007).

Fu, et al., "Formation of Graphitic Structures in Cobalt- and Nickel-Doped Carbon Aerogels," Langmuir, 21, pp. 2647-2651 (2005).

Fu, et al., "XPS Study of Copper-Doped Carbon Aerogels," Langmuir, 18:10100-10104 (2002).

Guittet, et al., "Bonding and XPS chemical shifts in $ZrSiO_4$ versus $SiO_2$ and $ZrO_2$: Charge transfer and electrostatic effects," Physical Review B, 63: 125117 (2001).

Hafner, et al., "Catalytic Growth of single-wall carbon nanotubes from metal particles," Chemical Physics Letters, 296, pp. 195-202 (1998).

Han, et al., Diameter-Controlled Synthesis of Discrete and Uniform-Sized Single-Walled Carbon Nanotubes Using Monodisperse Iron Oxide Nanoparticles Embedded in Zirconia Nanoparticle Arrays as Catalysts. J. of Physical Chemistry. May 22, 2004;108(24):8091-8095.

Hedrick, "Zirconium," United States Geological Survey, Mineral Commodity Summaries, U.S. Department. of the Interior, Reston, VA, vol. 19, pp. 2-193 (2008).

Hofmann et al., State of Transition Metal Catalysts During Carbon Nanotube Growth. J. Phys. Chem. C, 2009, 113 (5), pp. 1648-1656, Doi: 10.1021/jp808560p.

Huang, J. et al., "Catalysts effect on single-walled carbon nanotube branching," Diamond and Related Materials, vol. 16, No. 8, Aug. 2007, pp. 1524-1529.

Jasso et al., Nanostructured Carbon on Steam Reforming Catalysts. *Journal of New Materials for Electrochemical Systems*, 11, 95-98 (2008).

Joo, et al., "Multigram scale synthesis and characterization of monodisperse tetragonal zirconia nanocrystals" J. Am. Chem. Soc. 125:6553-6557 (2003).

Jung, et al., "Synthesis of carbon nanotubes grown by hot filament plasma-enhanced chemical vapor deposition method," Diamond and Related Materials, vol. 13, Issue 2, Feb. 2004, pp. 299-304.

Kanzow et al., Laser-assisted production of multi-walled carbon nanotubes from acetylene Chemical Physics Letters. Oct. 23, 1998; 295 (5-6): 525-30.

Karmakar et al., A new approach towards improving the quality and yield of arc-generated carbon nanotubes. J. Phys. D: Appl. Phys. 2007; 40 (16): 4829-35.

Karmakar et al., A novel approach towards selective bulk synthesis of few-layer graphenes in an electric arc. J. Phys. D: Appl. Phys. 2009; 42(11): 115201. 14 pages.

Kong, et al., "Chemical vapor deposition of methane for single-walled carbon nanotubes," Chemical Physics Letters, 292:567-574 (1998).

Kong, et al., "Synthesis of individual single-walled carbon nanotubes on patterned silicon wafers," Nature, 395:878-881 (1998).

Krasheninnikov et al., Ion-Irradiation-Induced Welding of Carbon Nanotubes. Physical Review B. 2002; 66(24):2455403. 6 pages.

Krasheninnikov et al., Irradiation Effects in Carbon Nanotubes. Nuclear Instruments and Methods in Physics Research B. 2004; 216: 355-366. doi:10.1016/j.nimb.2003.11.061.

Kurti, et al., "The geometry and the radial breathing mode of carbon nanotubes: beyond the ideal behaviour," New Journal of Physics, 5, (125.1-125.21) (2003).

Kwok et al., Continuous Deposition of Carbon Nanotubes on a Moving Substrate by Open-Air Laser-Induced Chemical Vapor Deposition. Carbon. 2005; 43(12): 2571-8.

Lee, et al., "Carbon nanotubes produced by tungsten-based catalyst using vapor phase deposition method," Chemical Physics Letters, 361:469-472 (2002).

Lee, et al., Synthesis of carbon nanotubes over gold nanoparticle supported catalysts. Carbon. 2005; 43:2654-2663. doi:10.1016/j.carbon.2005.05.045.

Maruyama et al., "Low-temperature synthesis of high-purity single-walled carbon nanotubes from alcohol," Chem. Phys. Lett. 360:229-234 (2002).

Mattevi, et al., "Surface-bound chemical vapour deposition of carbon nanotubes: In situ study of catalyst activation," Physica E, 40:2238-2242 (2008).

Mattevi, et al., "In-situ X-ray Photoelectron Spectroscopy Study of Catalyst-Support Interactions and Growth of Carbon Nanotube Forests," The Journal of Physical Chemistry C, 112 :12207-12213 (2008).

McTaggart, "Reduction of Zirconium and Hafnium Oxides," Nature, 191:1192 (1961).

Miller, et al., "A mechanistic study of nitrous oxide adsorption and decomposition on zirconia," Catal. Lett., 46:213-221 (1997).

Morant, et al., "An XPS study of the interaction of oxygen with zirconium," Surface Science, 218:331-345 (1989).

Nishimura, et al., "In Situ Study of Iron Catalysts for Carbon Nanotube Growth Using X-Ray Diffraction Analysis," Japanese Journal of Applied Physics, 43: L471-L474 (2004).

Noda,et al., "Millimeter-Thick Single-Walled Carbon Nanotubes Forests: Hidden Role of Catalyst Support," Japanese Journal of Applied Physics, 46:L399-L401 (2007).

Ōya, et al., "Review: Phenomena of catalytic graphitization," Journal of Materials Science, 17:309-322 (1982).

Pekala, et al., "Organic aerogels: microstructural dependence of mechanical properties in compression," Journal of Non-Crystalline Solids, 125:67-75 (1990).

Plata et al., Multiple Alkynes React with Ethylene to Enhance Carbon Nanotube Synthesis, Suggesting a Polymerization-like Formation Mechanism. ACS Nano. 2010; 4(12): 7185-92.

Ritschel, et al., "Rhenium-Catalyzed Growth Carbon Nanotubes," The Journal of Physical Chemistry C, 111:8414-8417 (2007).

Rümmeli et al., Oxide catalysts for carbon nanotube and few layer grapheme formation. Physica Status Solidi. B. 2009;246 (11-12): 2530-3. DOI: 10.1002/pssb.200982259.

Sacks, et al., "Carbothermal reduction synthesis of nanocrystalline zirconium carbide and hafnium carbide powders using solution-derived precursors," Journal of Materials Science, 39, pp. 6057-6066 (2004).

Saito, et al., "Double resonance Raman spectroscopy of single-wall carbon nanotubes," New Journal of Physics, 5, (157.1-157.15) (2003).

Sharma, et al., "Site-Specific Fabrication of Fe Particles for Carbon Nanotube Growth," Nano Letters, 9:689-694 (2009).

Steiner III et al., "Iron-Doped Carbon Aerogels: Novel Porous Substrates for Direct Growth of Carbon Nanotubes," Langmuir, 23:5161-5166 (2007).

Steiner III, Engineering Carbon Nanostructures: Development of Novel Aerogel-Nanotube Composites and Optimization Techniques for Nanotube Growth. Master's Thesis. Massachusetts Institute of Technology. 2006.

Takagi, et al., "Single-Walled Carbon Nanotube Growth from Highly Activated Metal Nanoparticles," Nano Letters, 6:12, 2642-2645 (2006).

Terrones et al., Controlled production of aligned-nanotube bundles. Nature. Jul. 3, 1997; 388(6637): 52-5.

Tomaszewski et al., "Influence of Oxygen Partial Pressure on the Metastability of Undoped Zirconia Dispersed in Alumina Matrix," Journal of the European Ceramic Society, 15:17-23 (1995).

(56) References Cited

OTHER PUBLICATIONS

Tomishige, et al., "A novel method of direct synthesis of dimethyl carbonate from methanol and carbon dioxide catalyzed by zirconia," Catal. Lett., 58:225-229 (1999).

Vander Wal, et al., "Comparative flame and furnace synthesis of single-walled carbon nanotubes," Chemical Physics Letters, vol. 336, Issues 1-2, Mar. 9, 2001, pp. 24-32.

Wang, "Bimetallic Catalysts for the Efficient Growth of SWNTs on Surfaces," Chemistry of Materials, 16:799-805 (2004).

Wirth et al., The phase of iron catalyst nanoparticles during carbon nanotube growth. Chem. Mater. 2012; 24 (24): 4633-40. Doi: 10.1021/cm301402g.

Won, et al., "Growth of ZrC thin films by aerosol-assisted MOCVD," Journal of Crystal Growth, 304:324-332 (2007).

Wong, et al., "Carbon nanotubes field emission devices grown by thermal CVD with palladium as catalysts," Diamond and Related Materials, 13:2105-2112 (2004).

Yamada, et al., "Synthesis and diameter control of multi-walled carbon nanotubes over gold nanoparticle catalysts," Applied Catalysis, A: General, 302:201-207 (2006).

Yenilmez et al., Wafer scale production of carbon nanotube scanning probe tips for atomic force microscopy, Appl. Phys. Lett. 2002; (80): 2225-2227.

Yi et al., CVD growth and field electron emission of aligned carbon nanotubes on oxidized Inconel plates without addition of catalyst. Diamond and Related Materials. Jul.-Sep. 2010;19(7-9): 870-4. doi:10.1016/j.diamond.2010.02.009.

Yuan, et al., "Horizontally Aligned Single-Walled Carbon Nanotube on Quartz from a Large Variety of Metal Catalysts," Nano Letters, 8:2576-2579 (2008).

Zhou, et al., "Copper Catalyzing Growth of Single-Walled Carbon Nanotubes on Substrates," Nano Lett., 6, 2987-2990 (2006).

Zyuzin, et al., "X-ray, Raman and FTIRS studies of the miscrostructural evolution of zirconia particles caused by the thermal treatment," Journal of Solid State Chemistry, 179:2965-2971 (2006).

\* cited by examiner

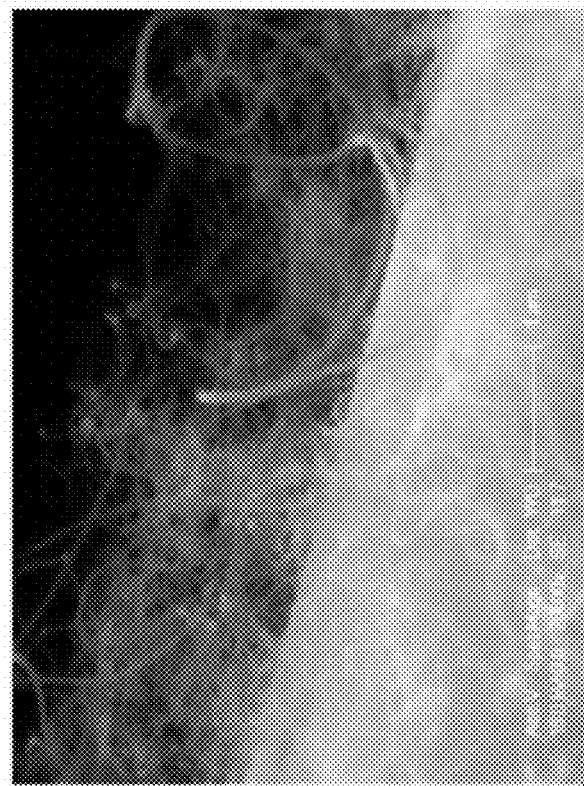
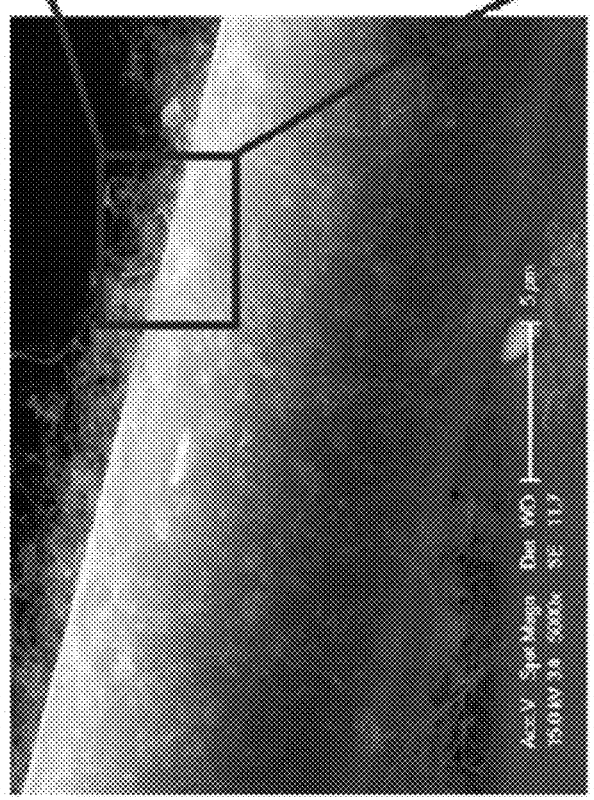
FIG. 4A
FIG. 4B

CARBON-BASED NANOSTRUCTURE FORMATION USING LARGE SCALE ACTIVE GROWTH STRUCTURES

RELATED APPLICATIONS

This application claims priority under 35 U.S.C. §119(e) to U.S. Provisional Patent Application Ser. No. 61/407,776, filed Oct. 28, 2010, and entitled "Carbon-Based Nanostructure Formation Using Large Scale Active Growth Structures," which is incorporated herein by reference in its entirety for all purposes.

FIELD OF INVENTION

Systems and methods for the formation of carbon-based nanostructures using large-scale active growth structures are generally described. The use of materials comprising basalt and/or titanium for growing carbon-based nanostructures is also described.

BACKGROUND

Carbon-based nanostructures (e.g., carbon nanotubes, carbon nanowires, graphene, and the like) are desirable for use in many systems due to their favorable mechanical, thermal, and electrical properties. Recent research has focused on improving the systems and methods used to make carbon-based nanostructures. An important consideration when designing such systems is the selection of material(s) on which the carbon-based nanostructures are formed. Many commonly used materials have one or more disadvantages associated with them. For example, some growth substrate materials can be relatively expensive. In addition, some growth substrate materials can degrade as the carbon-based nanostructures are formed. In addition, growth substrates generally need to have catalyst prepared so that nanoscale particles are created on the surface of a substrate for the formation of carbon-based nanostructures. Accordingly, improved systems, compositions, and methods are needed.

SUMMARY OF THE INVENTION

Systems and methods for the formation of carbon-based nanostructures using large-scale active growth structures are generally described. The use of active growth structures comprising basalt and/or titanium for growing carbon-based nanostructures is also described. The subject matter of the present invention involves, in some cases, interrelated products, alternative solutions to a particular problem, and/or a plurality of different uses of one or more systems and/or articles.

In one aspect, a method of growing carbon-based nanostructures is provided. In one set of embodiments, the method comprises exposing an active growth structure having a first cross-sectional dimension of at least about 1 mm to a carbon-based nanostructure precursor under conditions causing the formation of carbon-based nanostructures directly on the active growth structure.

The method comprises, in some embodiments, exposing basalt to a carbon-based nanostructure precursor under conditions causing the formation of carbon-based nanostructures on the basalt. In certain embodiments, the method comprises exposing titanium (e.g., elemental titanium) to a carbon-based nanostructure precursor under conditions causing the formation of carbon-based nanostructures on the titanium (e.g., directly on the titanium).

In another aspect, articles are provided. In one set of embodiments, the article comprises an active growth structure having a first cross-sectional dimension of at least about 1 mm in direct contact with a carbon-based nanostructure. In certain embodiments, the article comprises basalt and/or titanium in direct contact with a carbon-based nanostructure.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 4A-4B are exemplary scanning electron microscope images of carbon nanotubes grown on the surface of a basalt fiber, according to certain embodiments.

DETAILED DESCRIPTION

Figure 1:
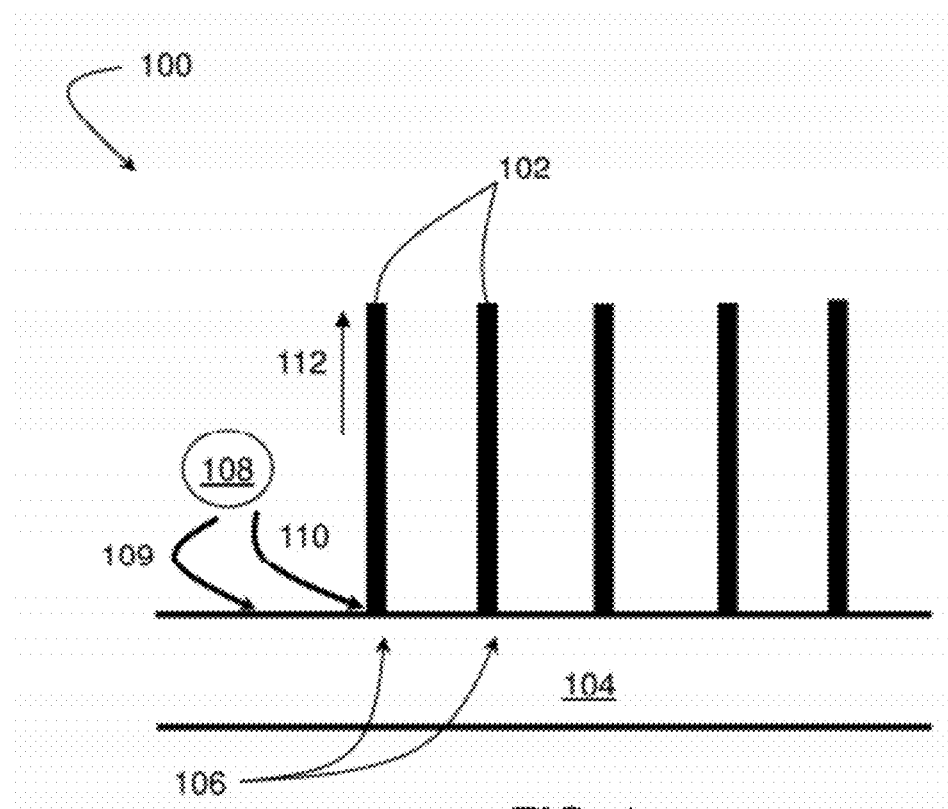
FIG. 1 is an exemplary schematic illustration of nanostructure growth on an active growth structure, according to some embodiments.

Systems and methods for the formation of carbon-based nanostructures using large-scale active growth structures are generally described. In addition, systems and methods related to the formation of carbon-based nanostructures using basalt and/or titanium (e.g., elemental titanium) are generally described. The carbon-based nanostructures can be grown by exposing the large-scale active growth structures, basalt, and/or titanium to a set of conditions selected to cause formation of carbon-based nanostructures on (e.g., directly on) the large-scale active growth structure, basalt, and/or titanium. When basalt and/or titanium are used as all or part of an active growth structure, the basalt and/or titanium can be in any suitable form such as, for example, a planar or non-planar active growth structure (which can have, in some cases, a first cross-sectional dimension of at least about 1 mm) comprising basalt and/or titanium (e.g., a fiber comprising basalt and/or titanium) and/or particles (e.g., nanoparticles) comprising basalt and/or titanium.

It has been discovered, within the context of an aspect of the invention, that relatively large-scale active growth structures can be used to produce carbon-based nanostructures. As used herein, the term "active growth structure" refers to a structure that is active throughout its exposed surface and that, when exposed to a set of conditions selected to cause formation of nanostructures, either enables formation of nanostructures that would otherwise not occur in the absence of the active growth structure under essentially identical conditions, or increases the rate of formation of nanostructures relative to the rate that would be observed under essentially identical conditions but without the active growth structure. "Essentially identical conditions," in this context, means conditions that are similar or identical (e.g., pressure, temperature, composition and concentration of species in the environment, etc.), other than the presence of the active growth structure. In some embodiments, the active growth structure can be part of a larger structure (e.g., when the active growth structure corresponds to a doped portion of a structure doped with an active material such as a metal, basalt, or the like). In other cases, the active growth structure can be a single, standalone structure (e.g., when the active growth structure is a titanium or basalt fiber, etc.).

Many previous systems have employed nanoscale catalysts (e.g., nanoparticle catalysts), often in combination with a support substrate, to produce carbon-based nanostructures. Growth of carbon-based nanostructures directly on a relatively large-scale active growth structure (in some cases, in the substantial absence of an auxiliary catalyst) can be attractive for a variety of reasons. As one example, relatively large-scale active growth structures can be relatively easy to handle, compared to, for example, nanoscale catalysts. In addition, the ability to grow carbon-based nanostructures in the absence of an auxiliary catalyst can simplify the process by which the nanostructures are grown, leading to a reduction in costs. As a specific example, growing nanostructures directly on a relatively long basalt or titanium fiber is relatively simple and inexpensive compared to growing nanostructures on nanoscale catalysts deposited on a large scale growth substrate.

It has also been discovered, within the context of an aspect of the invention, that basalt can be particularly useful in the growth of carbon-based nanostructures. As used herein, the term "basalt" is given its ordinary meaning in the art, and is used to refer to a class of igneous rock containing plagioclase feldspar and pyroxene. Basalt can also contain, in some cases, olivine, amphibols, quartz, and/or magnetite. Naturally occurring basalt is extrusive (i.e., it forms from the solidification of lava above a planet's crust), as opposed to intrusive igneous rocks such as granite, which solidify below a planet's surface.

Basalt can contain $SiO_2$, $Al_2O_3$, iron oxides (e.g., FeO and/or $Fe_2O_3$), MgO, CaO, and/or $Na_2O$. In some embodiments, the basalt described herein can contain between about 40 wt % and about 60 wt %, between about 45 wt % and about 58 wt %, or between about 52 wt % and about 57 wt % $SiO_2$. The basalt can contain, in some cases, between about 1 wt % and about 25 wt %, between about 5 wt % and about 16 wt %, between about 7 wt % and about 12 wt %, or between about 9 wt % and about 10 wt % iron oxides (e.g., at least about 1 wt %, at least about 5 wt %, at least about 7 wt %, or at least 9 wt % such as between about 1 wt % and about 25 wt %, between about 5 wt % and about 13 wt %, between about 7 wt % and about 11 wt %, or between about 9 wt % and about 10 wt % $Fe_2O_3$ and/or at least about 1 wt %, at least about 5 wt %, at least about 7 wt %, or at least 9 wt % such as between about 1 wt % and about 25 wt %, between about 5 wt % and about 13 wt %, between about 7 wt % and about 11 wt %, or between about 9 wt % and about 10 wt % FeO). In some cases, the basalt can contain between about 5 wt % and about 20 wt %, between about 6 wt % and about 15 wt %, or between about 8 wt % and about 9 wt % $Al_2O_3$. In some embodiments, the basalt can contain between about 4 wt % and about 10 wt % or between about 6 wt % and about 8 wt % MgO. The basalt can contain, in some instances, between about 5 wt % and about 15 wt %, between about 8 wt % and about 14 wt %, or between 11 wt % and about 13 wt % CaO. In some embodiments, the basalt can contain between about 1 wt % and about 15 wt %, between about 2 wt % and about 10 wt %, or between about 3 wt % and about 5 wt % $Na_2O$. Basalt can also include, in some cases, one or more of $K_2O$, $TiO_2$, $P_2O_5$, MnO, and $Cr_2O_3$. One of ordinary skill in the art would be capable of determining the chemical composition of a basalt sample using, for example, energy dispersive X-ray spectroscopy as described, for example, in Yamamoto, N., A. J. Hart, S. S. Wicks, E. J. Garcia, B. L. Wardle, and A. H. Slocum. "High-yield atmospheric-pressure growth of aligned carbon nanotubes on ceramic fibers for multifunctional enhancement of structural composites." *Carbon* 47, no. 3 (2009), pp 551-560. It should be understood that the basalt material used to grow the nanostructures can include additional additives not described above, in some instances.

In some embodiments, basalt can either enable the formation of nanostructures that would otherwise not occur in the absence of the basalt under essentially identical conditions, or can increase the rate of formation of nanostructures relative to the rate that would be observed under essentially identical conditions but without the basalt. "Essentially identical conditions," in this context, means conditions that are similar or identical (e.g., pressure, temperature, composition and concentration of species in the environment, etc.), other than the presence of the basalt. In some embodiments, the basalt is not consumed during the formation of the nanostructures. Not wishing to be bound by any particular theory, the basalt might act as a catalyst in the formation of the carbon-based nanostructures, in some embodiments. In particular, iron oxide (e.g., FeO, $Fe_2O_3$) within the basalt might catalyze the formation of carbon-based nanostructures. Other metal oxides might also catalyze the formation of carbon-based nanostructures, such as MgO, MnO and TiO.

The use of basalt to produce carbon-based nanostructures is attractive for a variety of reasons. Basalt is a relatively abundant material and therefore inexpensive relative to many other materials that have been used for carbon-based nanostructure growth, such as gold, platinum, and rhenium. Basalt is also non-toxic and can be handled relatively easily. In addition, basalt can be inexpensively processed to produce fibers and other suitable forms on which carbon-based nanostructures can be grown. Basalt is also relatively non-reactive with many substrate materials, and can be used in coordination with other growth substrate materials without degrading them.

It has also been discovered, within the context of an aspect of the invention, that titanium (e.g., elemental titanium, for example, in the form of a metal sheet, fiber, particle (e.g., nanoparticle), or other form) can be particularly useful in the growth of carbon-based nanostructures. In certain embodiments, carbon-based nanostructures (e.g., carbon nanotubes) can be grown directly on titanium (e.g., elemental titanium), for example, in the substantial absence of an auxiliary catalyst. In some embodiments, titanium can either enable the formation of nanostructures that would otherwise not occur in the absence of the titanium under essentially identical conditions, or can increase the rate of formation of nanostructures relative to the rate that would be observed under essentially identical conditions but without the titanium.

Elemental titanium on which the nanostructures can be formed can comprise, for example, a titanium metal and/or a titanium alloy. The growth of carbon-based nanostructures on titanium can be used, for example, to reinforce a part that is formed using titanium. As one specific example, carbon-based nanostructures (e.g., carbon nanotubes) could be grown on or within titanium bolts, titanium screws, titanium nails, or other fasteners comprising titanium, and the carbon-based nanostructures can provide additional strength to the bolt, screw, nail, or other fastener when it is used to join two materials. As another example, carbon-based nanostructures can be grown on the surface of or within a titanium article (e.g., a sheet comprising titanium, a cast or forged part comprising titanium, or other suitable article) to structurally reinforce one or more surfaces and/or the bulk of the titanium article.

As used herein, the term "carbon-based nanostructure" refers to articles having a fused network of aromatic rings, at least one cross-sectional dimension of less than about 1 micron, and comprising at least about 30% carbon by mass. In some embodiments, the carbon-based nanostructures may comprise at least about 40%, at least about 50%, at least about 60%, at least about 70%, at least about 80%, at least about 90%, or at least about 95% of carbon by mass, or more. The term "fused network" might not include, for example, a biphenyl group, wherein two phenyl rings are joined by a single bond and are not fused. Example of carbon-based nanostructures include carbon nanotubes (e.g., single-walled carbon nanotubes, double-walled carbon nanotubes, multi-walled carbon nanotubes, etc.), carbon nanowires, carbon nanofibers, carbon nanoshells, graphene, fullerenes, and the like.

In some embodiments, a carbon-based nanostructure may have a least one cross-sectional dimension of less than about 500 nm, less than about 250 nm, less than about 100 nm, less than about 75 nm, less than about 50 nm, less than about 25 nm, less than about 10 nm, or, in some cases, less than about 1 nm. Carbon-based nanostructures described herein may have, in some cases, a maximum cross-sectional dimension of less than about 1 micron, less than about 500 nm, less than about 250 nm, less than about 100 nm, less than about 75 nm, less than about 50 nm, less than about 25 nm, less than about 10 nm, or, in some cases, less than about 1 nm. In some instances, the carbon-based nanostructures described herein may have, two orthogonal maximum cross-sectional dimension of less than about 1 micron, less than about 500 nm, less than about 250 nm, less than about 100 nm, less than about 75 nm, less than about 50 nm, less than about 25 nm, less than about 10 nm, or, in some cases, less than about 1 nm. As used herein, the "maximum cross-sectional dimension" of a structure (e.g., a carbon-based nanostructure, an active growth structure, etc.) refers to the largest distance between two opposed boundaries of the structure that may be measured. The "average maximum cross-sectional dimension" of a plurality of structures refers to the number average.

In some embodiments, the carbon-based nanostructures described herein may comprise carbon nanotubes. As used herein, the term "carbon nanotube" is given its ordinary meaning in the art and refers to a substantially cylindrical molecule or nanostructure comprising a fused network of primarily six-membered rings (e.g., six-membered aromatic rings) comprising primarily carbon atoms. In some cases, carbon nanotubes may resemble a sheet of graphite formed into a seamless cylindrical structure. It should be understood that the carbon nanotube may also comprise rings or lattice structures other than six-membered rings. Typically, at least one end of the carbon nanotube may be capped, i.e., with a curved or nonplanar aromatic structure. Carbon nanotubes may have a diameter of the order of nanometers and a length on the order of millimeters, or, on the order of tenths of microns, resulting in an aspect ratio greater than 100, 1000, 10,000, 100,000, $10^6$, $10^7$, $10^8$, $10^9$, or greater. Examples of carbon nanotubes include single-walled carbon nanotubes (SWNTs), double-walled carbon nanotubes (DWNTs), multi-walled carbon nanotubes (MWNTs) (e.g., concentric carbon nanotubes), inorganic derivatives thereof, and the like. In some embodiments, the carbon nanotube is a single-walled carbon nanotube. In some cases, the carbon nanotube is a multi-walled carbon nanotube (e.g., a double-walled carbon nanotube). In some cases, the carbon nanotube may have a diameter less than about 1 micron, less than about 500 nm, less than about 250 nm, less than about 100 nm, less than about 50 nm, less than about 25 nm, less than about 10 nm, or, in some cases, less than about 1 nm.

In one aspect, systems and methods for growing carbon-based nanostructures using relatively large-scale active growth structures are provided. In some cases, the relatively large-scale active growth structures can be exposed to a carbon-based nanostructure precursor under conditions causing the formation of carbon-based nanostructures on the active growth structures. FIG. 1 includes a schematic illustration of an exemplary system 100 for growing carbon-based nanostructures directly on an active growth structure 104. The active growth structure 104 can be provided in a variety of forms including, but not limited to, a wafer, a fiber, a tow of fibers, a weave, a belt (e.g., in the case of a conveyor belt), or any other suitable form for supporting nanostructure growth.

In some embodiments, carbon-based nanostructures can be grown on an active growth structure (e.g., a relatively large-scale active growth structure) in the absence of a catalyst auxiliary to the active growth structure. In this context, an "auxiliary catalyst" is used to refer to a catalyst that is not interconnected with the active growth structure to form a single, integral structure. For example, in cases where a nanoparticle catalyst is deposited on a active growth structure, the nanoparticle catalyst would be considered an auxiliary catalyst.

As noted above, the active growth structure can have a relatively large scale. In some cases, the active growth structure has a relatively large scale in at least 1 direction (e.g., in the case of an elongated fiber). In some cases, the active growth structure can have at least one cross-sectional dimension of at least about 1 micron, at least about 10 microns, at least about 100 microns, at least about 1 mm, at least about 5 mm, at least about 1 cm, at least about 5 cm, at least about 10 cm, at least about 50 cm, at least about 1 m, at least about 2 m, at least about 5 m, between about 1 micron and about 100 m, between about 10 microns and about 100 m, between about 100 microns and about 100 m, between about 1 mm and about 100 m, between about 5 mm and about 100 m, between about 1 cm and about 100 m, between about 5 cm and about 100 m, between about 10 cm and about 100 m, between about 50 cm and about 100 m, between about 1 m and about 100 m, between about 2 m and about 100 m, or between about 5 m and about 100 m.

In some cases, the active growth structure can have a relatively large scale in at least two orthogonal directions (e.g., in the case of a film or sheet). For example, in some embodiments, the active growth structure can have a first cross-sectional dimension and a second cross-sectional dimension that is orthogonal to the first cross-sectional dimension. In some such cases, each of the first and second cross-sectional dimensions at least about 1 micron, at least about 10 microns, at least about 100 microns, at least about 1 mm, at least about 5 mm, at least about 1 cm, at least about 5 cm, at least about 10 cm, at least about 50 cm, at least about 1 m, at least about 2 m, at least about 5 m, between about 1 micron and about 100 m, between about 10 microns and about 100 m, between about 100 microns and about 100 m, between about 1 mm and about 100 m, between about 5 mm and about 100 m, between about 1 cm and about 100 m, between about 5 cm and about 100 m, between about 10 cm and about 100 m, between about 50 cm and about 100 m, between about 1 m and about 100 m, between about 2 m and about 100 m, or between about 5 m and about 100 m. In some such embodiments, the first cross-sectional dimension of the active growth structure can be the maximum cross-sectional dimension of the active growth structure.

In some cases, the active growth structure can have a relatively large scale in at least three orthogonal directions. For example, in some embodiments, the active growth structure can have a first cross-sectional dimension, a second cross-sectional dimension that is orthogonal to the first cross-sectional dimension, and a third cross-sectional dimension that is orthogonal to both the first and second cross-sectional dimensions. In some such cases, each of the first, second, and third cross-sectional dimensions are at least about 1 micron, at least about 10 microns, at least about 100 microns, at least about 1 mm, at least about 5 mm, at least about 1 cm, at least about 5 cm, at least about 10 cm, at least about 50 cm, at least about 1 m, at least about 2 m, at least about 5 m, between about 1 micron and about 100 m, between about 10 microns and about 100 m, between about 100 microns and about 100 m, between about 1 mm and about 100 m, between about 5 mm and about 100 m, between about 1 cm and about 100 m, between about 5 cm and about 100 m, between about 10 cm and about 100 m, between about 50 cm and about 100 m, between about 1 m and about 100 m, between about 2 m and about 100 m, or between about 5 m and about 100 m. In some such embodiments, the first cross-sectional dimension of the active growth structure can be the maximum cross-sectional dimension of the active growth structure.

The active growth structure can, in some instances, have a minimum cross-sectional dimension of at least about 1 micron, at least about 10 microns, at least about 100 microns, at least about 1 mm, at least about 5 mm, at least about 1 cm, at least about 5 cm, at least about 10 cm, at least about 50 cm, at least about 1 m, at least about 2 m, at least about 5 m, between about 1 micron and about 100 m, between about 10 microns and about 100 m, between about 100 microns and about 100 m, between about 1 mm and about 100 m, between about 5 mm and about 100 m, between about 1 cm and about 100 m, between about 5 cm and about 100 m, between about 10 cm and about 100 m, between about 50 cm and about 100 m, between about 1 m and about 100 m, between about 2 m and about 100 m, or between about 5 m and about 100 m. As used herein, the "minimum cross-sectional dimension" of a structure (e.g., an active growth structure, a carbon-based nanostructure, etc.) refers to the smallest distance between two opposed boundaries of the structure that may be measured.

In some embodiments, the active growth structure can be in the form of an elongated structure, with one large dimension and two relatively short dimensions orthogonal to the long dimension, with an aspect ratio or at least about 2:1, at least about 3:1, at least about 5:1, at least about 10:1, at least about 50:1, at least about 100:1, at least about 1000:1, or greater. In some cases, the active growth structure can be in the form of an thin film or sheet, with one small dimension and two relatively long dimensions orthogonal to the short dimension, with an aspect ratio or at least about 2:1, at least about 3:1, at least about 5:1, at least about 10:1, at least about 50:1, at least about 100:1, at least about 1000:1, or greater.

Referring back to the set of embodiments illustrated in FIG. 1, one or more portions of active growth structure 104 can be exposed to a set of conditions selected to cause formation of nanostructures on the active growth structure (e.g., on the surface of the active growth structure). For example, carbon-based nanostructures 102 can be formed directly on surface portions 106 of active growth structure 104.

A carbon-based nanostructure precursor can be used to grow carbon-based nanostructures. In the set of embodiments illustrated in FIG. 1, carbon-based nanostructure precursor 108 can be delivered to active growth structure 104. The carbon-based nanostructure precursor 108 can contact or permeate the active growth structure surface (e.g., via arrow 109) and/or the interface between the active growth structure and a nanostructure (e.g., via arrow 110). This can lead to the formation of carbon-based nanostructures 102 on portions 106 of the active growth structure.

A variety of materials may be suitable for use in forming active growth structure 104. In some embodiments, all or part of the active growth structure can be formed of a metal oxide, a metalloid oxide, a metal chalcogenide (e.g., metal sulfides, metal selenides, and/or metal tellurides), and/or a metalloid chalcogenide (e.g., metalloid sulfides, metalloid selenides, and/or metalloid tellurides). In some cases, the active growth structure may comprise a metal and/or metalloid carbide, nitride, phosphide, silicide, or combination of these. Examples of suitable active growth structure materials include, but are not limited to, oxide and chalcogenide forms of zirconium, hafnium, tantalum, niobium, yttrium, lanthanum, molybdenum, lanthanide metals, titanium, aluminum, rhenium, and calcium, silicon, boron, and germanium, among others. As described in more detail below, the growth of carbon-based nanostructures on basalt can be particularly advantageous, and, accordingly, all or part of the active growth structure can be formed of basalt. In certain embodiments, active growth structure 104 comprises titanium (e.g., elemental titanium).

In some cases, all or part of the active growth structure can be formed of one or more elemental metals. Suitable metals can include, but are not limited to iron Group 1-15 metals, Group 2-14 metals, Group 3-12 metals, Group 8-10 metals, Group 4 metals, or a combination of one or more of these. Examples of Group 8 metals that may be used as all or part of the active growth structure can include, for example, iron, ruthenium, and/or osmium. Examples of Group 9 metals that may be used in all or part of the active growth structure can include, for example, cobalt, rhenium, and/or iridium. Examples of Group 10 metals that can be used as all or part of the active growth structure can include, for example, nickel, palladium, and/or platinum. Examples of Group 4 metals that can be used as all or part of the active growth structure can include, for example, titanium, zirconium, and/or hafnium. In certain embodiments, the active growth substrate can comprise titanium. For example, in certain embodiments, all or part of the active growth structure can be formed of elemental titanium or a titanium alloy. In certain embodiments, all or part of the active growth structure can be formed of steel, in some embodiments. For example, all or part of the active growth structure can be formed of non-stainless steel (e.g., cold-rolled steel). In some instances, stainless steel including, but not limited to austenitic stainless steel, ferritic stainless steel, and/or martensitic stainless steel can be used as all of part of the active growth structure.

In certain embodiments, the active growth structure comprises a consolidated mixture of metal powders. For example, in some embodiments, the active growth structure can comprise particulate metal that has been fused (e.g., sintered) together to form a unitary structure. In certain embodiments, a mixture of metal particles that are not bound to each other can be used as an active growth substrate.

In another aspect, systems and methods for growing carbon-based nanostructures using basalt are provided. In some cases, the basalt can be exposed to a carbon-based nanostructure precursor under conditions causing the formation of carbon-based nanostructures on the basalt (e.g., directly on the basalt). The basalt on which the nanostructures are grown can be provided in a variety of forms. For example, in some cases, nanostructures can be grown on a large-scale active growth structure (e.g., having one or more of the relatively large cross-sectional dimensions described above) comprising basalt, such as the active growth structure described in FIG. 1. In some such embodiments, relatively large-scale active growth structure 104 can be formed of basalt (e.g., a planar substrate formed from basalt, a non-planar substrate (e.g., a fiber) formed from basalt, etc.). In other cases, active growth structure 104 can include both a non-basalt growth substrate material and basalt.

Figure 2A:
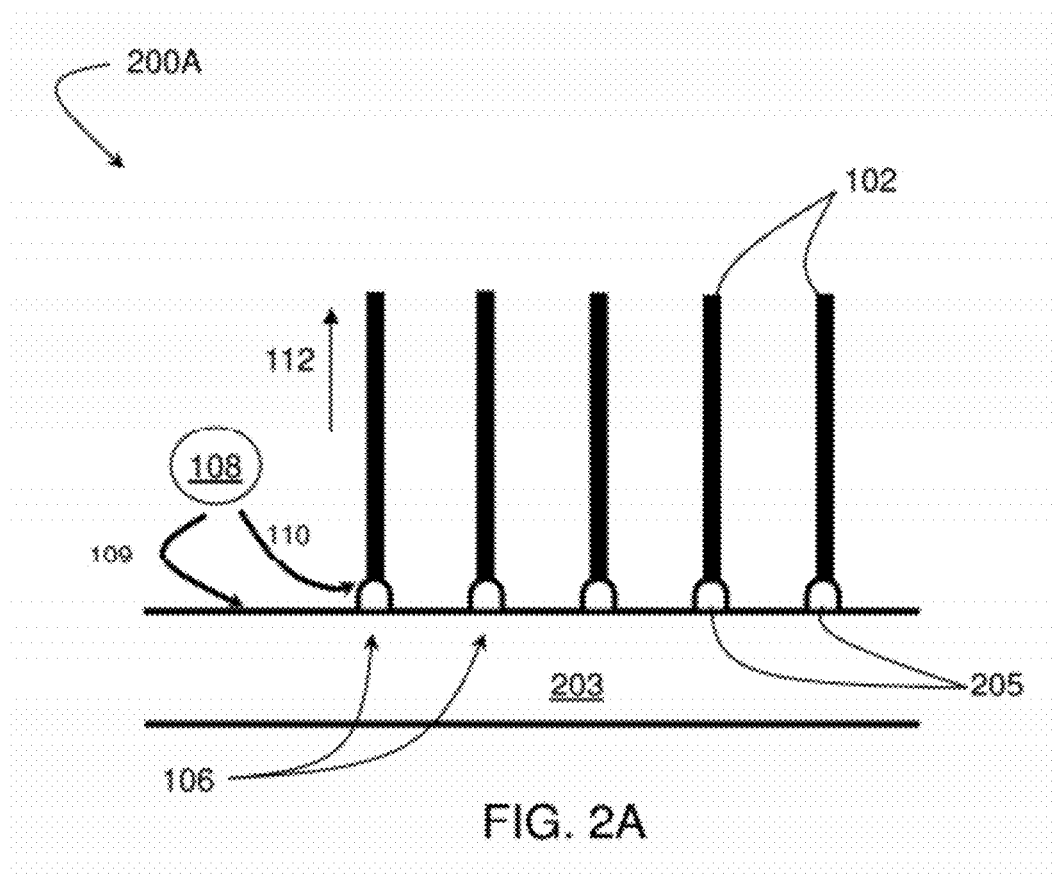
FIGS. 2A-2B are, according to certain embodiments, exemplary schematic illustrations of nanostructure growth using basalt.

In some embodiments, basalt particles (e.g., nanoparticles) can be deposited on a growth substrate (e.g., an active growth substrate material and/or a non-active growth substrate material). For example, FIG. 2A includes a schematic illustration of system 200A in which particles 205 comprising basalt are in contact with growth substrate material 203 (which can include an active growth structure or a non-active growth structure). Particles 205 can be formed of basalt, in some embodiments. In other cases, particles 205 can include a non-basalt material and basalt (e.g., a non-basalt material in which basalt is impregnated and/or on which basalt is formed).

One or more portions of the basalt (either in large-scale form or in small particle form) can be exposed to a set of conditions selected to cause formation of nanostructures on the basalt. For example, when active growth structure 104 in FIG. 1 contains basalt, carbon-based nanostructures 102 can be formed directly on portions 106 of the basalt active growth structure 104. In the set of embodiments illustrated in FIG. 2A, particles 205 comprising basalt can be in contact with growth substrate portions 106, and carbon-based nanostructures 102 can be formed on the particles.

As noted above, a carbon-based nanostructure precursor can be used to grow carbon-based nanostructures. For example, precursor 108 can be used to grow nanostructures from a relatively large-scale basalt growth structure (e.g., similar to the active growth structure described in FIG. 1). In the set of embodiments illustrated in FIG. 2A, carbon-based nanostructure precursor 108 can be delivered to growth substrate 203 and contact or permeate the growth substrate surface (e.g., via arrow 109) and/or precursor 108 can be delivered to the interface between basalt-containing particles 205 and the nanostructures (e.g., via arrow 110). This can lead to the formation of carbon-based nanostructures 102 on basalt-containing particles 205.

Figure 2B:
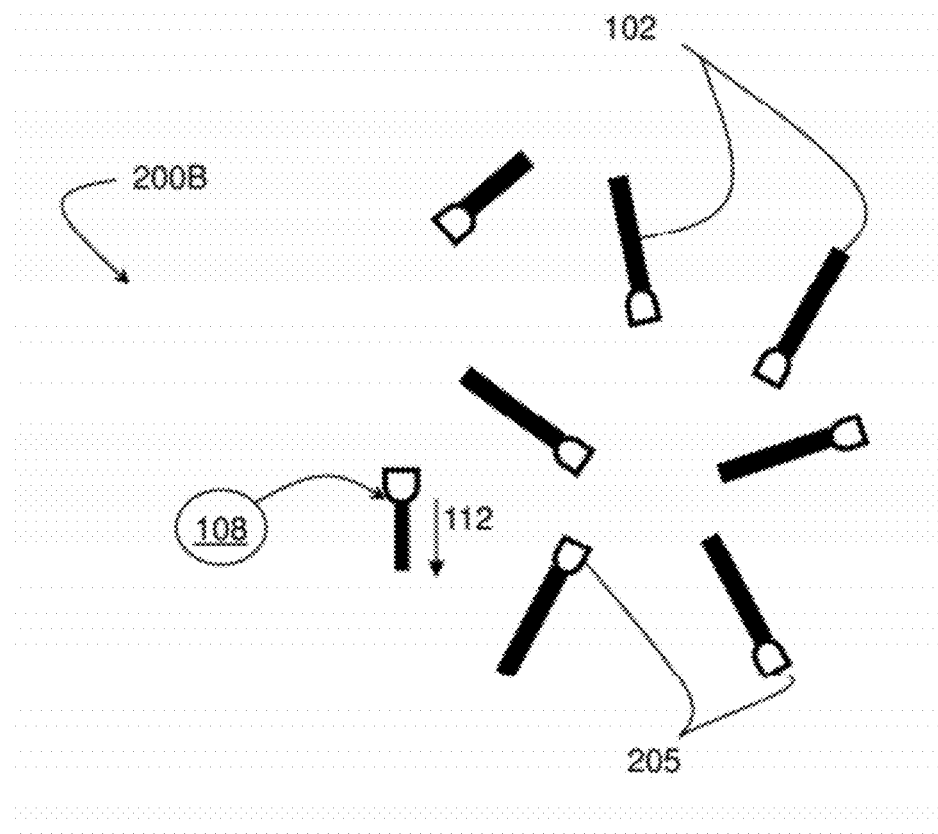

In still other embodiments, a growth substrate might not be used, and nanostructures can be formed on a particle (e.g., nanoparticle) comprising basalt in the absence of a growth substrate. For example, FIG. 2B includes a schematic illustration of system 200B in which basalt-containing particles 205 (e.g., nanoparticles) are exposed to carbon-based nanostructure precursor 108 under conditions selected to cause formation of carbon-based nanostructures 102 on the particles. In some embodiments, the basalt-containing particles may be suspended in a fluid. For example, in some embodiments, basalt-containing particles can be suspended in a gas (e.g., aerosolized) and subsequently exposed to a carbon-based nanostructure precursor, from which carbon-based nanostructures may be grown. As a specific example, the basalt might be introduced and suspended in a hydrocarbon gas (e.g., ferrocene). In addition to suspending the basalt, the hydrocarbon gas can be deposited on the basalt to produce carbon-based nanostructures. In some cases, the basalt-containing particles may be suspended in a liquid (e.g., an alcohol that serves as a carbon-based nanostructure precursor) during the formation of the carbon-based nanostructures.

Carbon-based nanostructure precursors may be in any suitable phase (e.g., solid, liquid, or gas) and can include, for example, hydrocarbons (e.g., methane, ethylene, acetylene, etc.), alcohols, and the like. The carbon-based nanostructure precursor can include carbon, such that carbon dissociates from the precursor molecule and can be incorporated into the growing carbon-based nanostructure (e.g., carbon nanotube), which is pushed upward from the growth substrate and/or basalt-containing particle with continued growth. For example, in the set of embodiments illustrated in FIGS. 1 and 2A-2B, carbon-based nanostructures grow in general direction 112 as a carbon-based nanostructure precursor 108 dissociates from the precursor molecule and is incorporated into the nanostructure. Given the disclosure herein, those of ordinary skill in the art would be able to select the appropriate carbon-based nanostructure precursor material(s) for the growth of a particular carbon-based nanostructure. For example, carbon nanotubes may be synthesized by reaction of a $C_2H_4/H_2$ mixture with a basalt (e.g., in a basalt-containing growth substrate, in a basalt-containing particle). Other examples of carbon-based nanostructure precursors that may be used include, for example, methane, ethanol, methyl formate, acetylene, and other alkynes. Examples of suitable nanostructure fabrication techniques are discussed in more detail in International Patent Application Serial No. PCT/US2007/011914, filed May 18, 2007, entitled "Continuous Process for the Production of Nanostructures Including Nanotubes," published as WO 2007/136755 on Nov. 29, 2007, which is incorporated herein by reference in its entirety.

The carbon-based nanostructure precursor can comprise a solid, in some embodiments. Exemplary solid precursors include, but are not limited to, coal, coke, amorphous carbon, unpyrolyzed organic polymers (e.g., phenol-formaldehyde, resorcinol-formaldehyde, melamine-formaldehyde, etc.) partially pyrolyzed organic polymers, diamond, graphite, or any other suitable solid form of carbon. In some embodiments, the solid precursor may comprise at least about 25 wt % carbon, at least about 50 wt % carbon, at least about 75 wt % carbon, at least about 85 wt % carbon, at least about 90 wt % carbon, at least about 95 wt % carbon, at least about 98 wt % carbon, or at least about 99 wt % carbon.

In some embodiments in which basalt is in contact with a non-basalt growth substrate material, the non-basalt growth substrate material and/or the conditions under which the nanostructures are grown can be selected such that the amount of chemical interaction or degradation between the non-basalt growth substrate material and the basalt is relatively small. For example, in some cases, the basalt does not diffuse significantly into or significantly chemically react with the non-basalt growth substrate material during formation of the nanostructures. One of ordinary skill in the art will be able to determine whether basalt has diffused significantly into or significantly chemically reacted with a non-basalt growth substrate material. For example, X-ray photoelectron spectroscopy (XPS), optionally with depth profiling, may be used to determine whether basalt has diffused into a non-basalt growth substrate material or whether elements of the non-basalt growth substrate material have diffused into the basalt. X-ray diffraction (XRD), optionally coupled with XPS, may be used to determine whether basalt and a non-basalt growth substrate material have chemically reacted with each other. Secondary ion mass spectroscopy (SIMS) can be used to determine chemical composition as a function of depth.

Figure 3:
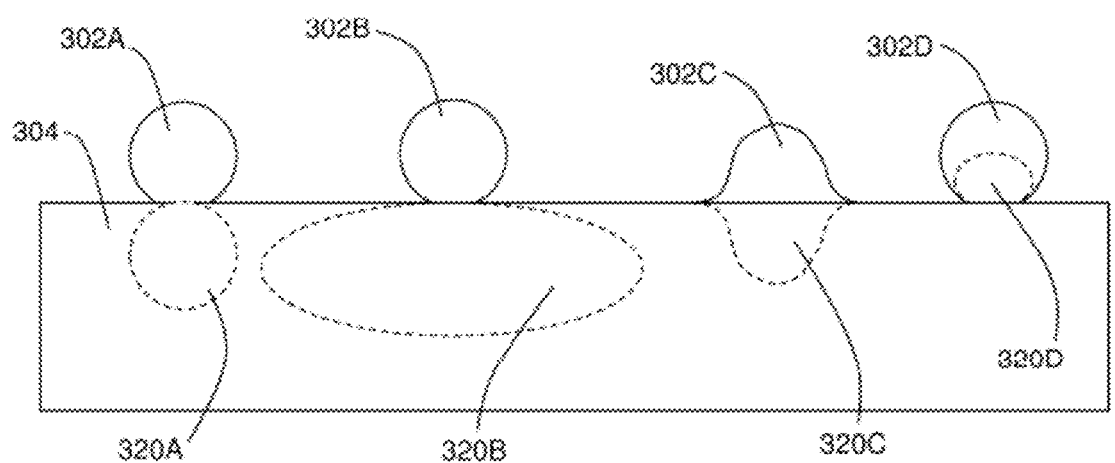
FIG. 3 is a schematic illustration of the interaction between basalt and a non-basalt growth substrate material, according to one set of embodiments.

FIG. 3 illustrates mechanisms by which particles 302A-D could potentially interact with a growth substrate material 304. The volume within which the particles interact with the growth substrate material is shown as volumes 320A-D. In FIG. 3, spherical particle 302A interacts with growth substrate material 304 over volume 320A, which is roughly equivalent to the original volume of particle 302A. Spherical particle 302B interacts with growth substrate material 304 over volume 320B, which is roughly equivalent to three times the original volume of particle 302B. Wetted particle 302C is shown interacting with growth substrate material 304 over volume 320C, which is roughly equivalent to the original volume of particle 302C. In addition, growth substrate material 304 is illustrated diffusing into particle 302D, with the interaction volume indicated as volume 320D. Chemical reaction between the basalt and the non-basalt growth substrate material might occur, in which case the volume within which the basalt and the non-basalt growth substrate material interact is defined by the volume of the reaction product. The volume of the chemical reaction product may be determined, for example, via XPS analysis, using XRD to determine the chemical composition of the product and verify that it originated from the basalt. In some cases, the basalt may diffuse into the non-basalt growth substrate material or the non-basalt growth substrate material may diffuse into the basalt, in which case the volume within which the basalt and the non-basalt growth substrate material interact is defined by the volume over which the basalt and/or the non-basalt growth substrate material diffuses. The volume over which basalt diffuses can be determined, for example, using XPS with depth profiling.

In some embodiments, the volume within which basalt interacts with a non-basalt growth substrate material (e.g., the volume of the product produced via a chemical reaction between basalt and a non-basalt growth substrate material, the volume over which basalt and/or a non-basalt growth substrate material diffuses into the other, etc.) is relatively small compared to the original volume of the basalt as formed on or in the non-basalt growth substrate material. In some instances, the volume of the basalt as formed on or in the non-basalt growth substrate material is at least about 0.1%, at least about 0.5%, at least about 1%, at least about 5%, at least about 10%, at least about 25%, at least about 50%, at least about 100%, at least about 200%, at least about 500%, at least about 2500%, at least about 5000%, at least about 10,000%, at least about 50,000%, or at least about 100,000% greater than the volume within which the basalt interacts with the non-basalt growth substrate material (e.g., via reaction, via diffusion, via a combination of mechanisms, etc.).

In some embodiments, the mass percentage of the basalt that interacts with the non-basalt growth substrate material (e.g., via reaction of the basalt and the non-basalt growth substrate material, diffusion of the basalt into non-basalt growth substrate material, diffusion of the non-basalt growth substrate material into the basalt, or a combination of these) is relatively low. In some embodiments, less than about 50 atomic %, less than about 25 atomic %, less than about 10 atomic %, less than about 5 atomic %, less than about 2 atomic %, or less than about 1 atomic % of the basalt as formed on or in the non-basalt growth substrate material interacts with the non-basalt growth substrate material. The percentage of the basalt that interacts with the non-basalt growth substrate material can be determined, for example, using XPS with depth profiling. Optionally, XRD can be employed to determine the composition of the measured material.

Interaction between the basalt and the non-basalt growth substrate material may be determined, in some embodiments, by measuring the conductivity of the growth substrate (e.g., the non-basalt growth substrate material) before and after the growth of the nanostructures. In some cases, the resistance of the growth substrate (e.g., the non-basalt growth substrate material) does not change by more than about 100%, by more than about 50%, by more than about 25%, by more than about 10%, by more than about 5%, or by more than about 1% relative to the resistance of a growth substrate exposed to essentially identical conditions in the absence of the basalt. "Essentially identical conditions," in this context, means conditions that are similar or identical, other than the presence of the basalt. For example, otherwise identical conditions may refer to a growth substrate that is identical and an environment that is identical (e.g., identical temperature, pressure, gas composition, gas concentration, other processing conditions, etc.), but where the basalt is not present. Suitable techniques for measuring the resistance of a growth substrate are described, for example, in ASTM Designation: D 257-99, entitled "Standard Test Methods for DC Resistance or Conductance of Insulating Materials" (Reapproved 2005), which is incorporated herein by reference in its entirety.

In some cases, the interaction of the basalt and the non-basalt growth substrate material may be determined by measuring the tensile strength of the growth substrate before and after formation of the nanostructures. In some embodiments, the tensile strength of the growth substrate is less than about 20% lower, less than about 10% lower, less than about 5% lower, or less than about 1% lower than the tensile strength of a growth substrate exposed to essentially identical conditions in the absence of the basalt. Suitable techniques for measuring the tensile strength of a single fiber (e.g., a carbon or graphite fiber) can be found, for example, in "Standard Test Method for Tensile Strength and Young's Modulus of Fibers," ASTM International, Standard ASTM C 1557-03, West Conshohocken, Pa., 2003, which is incorporated herein by reference in its entirety. Suitable techniques for measuring the tensile strength of other growth substrates may be found, for example, in M. Madou, "Fundamentals of Microfabrication," 2nd edition, CRC Press (2002), which is incorporated herein by reference in its entirety.

In certain embodiments, systems and methods for growing carbon-based nanostructures using titanium are provided. Titanium can replace basalt or be added to basalt in any of the embodiments described herein. Accordingly, it should be understood that in each place herein where the use of basalt to grow carbon-based nanostructures is described, titanium can replace the basalt or titanium can be added to the basalt. For example, in certain embodiments, active growth structure 104 in FIG. 1 can comprise titanium in addition to or in place of basalt. In certain embodiments, particles 205 in FIG. 2A can comprise titanium, in addition to or in place of basalt. The titanium can be exposed to a carbon-based nanostructure precursor to grow carbon-based nanostructures, as described in detail above with respect to basalt. In addition, in certain embodiments, the titanium might be deposited on a non-titanium growth substrate; for example, in certain embodiments, particles 205 in FIG. 2A can contain titanium in addition to or in place of basalt, and substrate 203 can comprise a non-titanium substrate. In addition, in certain embodiments, growth on titanium can be achieved in the absence of a growth substrate. For example, in certain embodiments, particles 205 in FIG. 2B can contain titanium in addition to or in place of basalt, and carbon-based nanostructures can be grown from the titanium-containing particles in the absence of a supporting substrate, as described in detail above with respect to basalt. In certain embodiments, the titanium and a non-titanium growth substrate can be selected such that the titanium does not interact with the non-titanium growth substrate, or interacts with the non-titanium growth substrate only to a small degree (e.g., any of the degrees mentioned above with respect to basalt).

In some instances, the basalt and/or titanium used to form carbon-based nanostructures can be in the form of nanoparticles. Generally, the term "nanoparticle" is used to refer to any particle having a maximum cross-sectional dimension of less than about 1 micron. In some embodiments, a nanoparticle comprising basalt and/or titanium may have a maximum cross-sectional dimension of less than about 500 nm, less than about 250 nm, less than about 100 nm, less than about 10 nm, less than about 5 nm, less than about 3 nm, less than about 2 nm, less than about 1 nm, between about 0.3 and about 10 nm, between about 10 nm and about 100 nm, or between about 100 nm and about 1 micron. A plurality of nanoparticles comprising basalt and/or titanium may, in some cases, have an average maximum cross-sectional dimension of less than about 1 micron, less than about 100 nm, less than about 10 nm, less than about 5 nm, less than about 3 nm, less than about 2 nm, less than about 1 nm, between about 0.3 and about 10 nm, between about 10 nm and about 100 nm, or between about 100 nm and about 1 micron.

A variety of growth substrates may be used in accordance with the systems and methods described herein in which basalt and/or titanium are used in an active growth structure. Growth substrates may comprise basalt and/or any non-basalt material capable of supporting the basalt structures and/or nanostructures as described herein. The growth substrate can, in some cases, comprise titanium and/or any non-titanium material capable of supporting the titanium structures and/or nanostructures as described herein. The growth substrate may be selected to be inert to and/or stable under sets of conditions used in a particular process, such as nanostructure growth conditions, nanostructure removal conditions, and the like. In some cases, the growth substrate comprises a substantially flat surface. In some cases, the growth substrate comprises a substantially nonplanar surface. For example, the growth substrate may comprise a cylindrical surface. In some cases, the growth substrate can comprise a fiber. For example, in some cases, the growth substrate can comprise a basalt fiber. In some instances, the growth substrate can comprise a non-basalt fiber (e.g., carbon fiber, glass fiber, etc.) on which basalt has been deposited and/or in which basalt has been impregnated. In some cases, the growth substrate can comprise a titanium fiber. In some instances, the growth substrate can comprise a non-titanium fiber (e.g., carbon fiber, glass fiber, etc.) on which titanium has been deposited and/or in which titanium has been impregnated.

Additional growth substrates suitable for use in the invention include high-temperature prepregs, high-temperature polymer resins, inorganic materials such as metals, alloys, intermetallics, metal oxides, metal nitrides, ceramics, and the like. As used herein, the term "prepreg" refers to one or more layers of thermoset or thermoplastic resin containing embedded fibers, for example fibers of carbon, glass, silicon carbide, and the like. In some embodiments, the growth substrate may comprise carbon (e.g., amorphous carbon, carbon aerogel, carbon fiber, graphite, glassy carbon, carbon-carbon composite, graphene, aggregated diamond nanorods, nanodiamond, diamond, and the like). In some cases, the growth substrate may be a fiber, tow of fibers, a weave (e.g., a dry weave), and the like. The growth substrate may further comprise a conducting material, such as conductive fibers, weaves, or nanostructures.

In some cases, the growth substrates as described herein may comprise polymers capable of withstanding the conditions under which nanostructures are grown. Examples of suitable polymers that can be used in the growth substrate include, but are not limited to, relatively high temperature fluoropolymers (e.g., Teflon®), polyetherether ketone (PEEK), and polyether ketone (PEK), and the like.

In some embodiments, the growth substrates and/or active growth structures used herein are substantially transparent to electromagnetic radiation. For example, in some cases, the growth substrate and/or active growth structure may be substantially transparent to visible light, ultraviolet radiation, infrared radiation, microwave radiation, or radar frequencies.

In some cases, the nanostructures may be grown on the active growth structure and/or growth substrate during formation of the active growth structure and/or growth substrate itself. For example, fibers (e.g., graphite fibers, basalt fibers, stainless steel fibers, titanium fibers, etc.) may be formed in a continuous process, in combination with nanostructure fabrication as described herein. In an illustrative embodiment, carbon fibers comprising nanostructures on the surface of the fibers may formed at elevated temperature by first stabilizing the carbon fiber precursor material, typically under stress at elevated temperature, followed by carbonization and or graphitization pyrolysis steps at elevated temperatures (e.g., greater than 500° C.) to form the fiber. Basalt, titanium, and/or an auxiliary catalyst can then, optionally, be added to the fiber. The nanostructures may be grown on the surface of the fibers and/or the basalt, titanium, or a catalyst on the fibers, followed by surface treatments, sizing, spooling, or other processing techniques.

As used herein, exposure to a "set of conditions" may comprise, for example, exposure to a particular temperature, pH, solvent, chemical reagent, type of atmosphere (e.g., nitrogen, argon, oxygen, etc.), electromagnetic radiation, or the like. In some cases, the set of conditions may be selected to facilitate nucleation, growth, stabilization, removal, and/or other processing of nanostructures. In some cases, the set of conditions may be selected to facilitate reactivation, removal, and/or replacement of the basalt, titanium, and/or a catalyst. In some cases, the set of conditions may be selected to maintain the activity of the basalt, titanium, and/or a catalyst. Some embodiments may comprise a set of conditions comprising exposure to a source of external energy. The source of energy may comprise electromagnetic radiation, electrical energy, sound energy, thermal energy, or chemical energy. For example, the set of conditions comprises exposure to heat or electromagnetic radiation, resistive heating, exposure to a laser, or exposure to infrared light. In some embodiments, the set of conditions comprises exposure to a particular temperature, pressure, chemical species, and/or carbon-based nanostructure precursor. For example, in some cases, exposure to a set of conditions comprises exposure to substantially atmospheric pressure (i.e., about 1 atm or 760 torr). In some cases, exposure to a set of conditions comprises exposure to a pressure of less than about 1 atm (e.g., less than about 100 torr, less than about 10 torr, less than about 1 torr, less than about 0.1 torr, less than about 0.01 torr, or lower). In some cases, the use of high pressure may be advantageous. For example, in some embodiments, exposure to a set of conditions comprises exposure to a pressure of at least about 2 atm, at least about 5 atm, at least about 10 atm, at least about 25 atm, or at least about 50 atm. In some instances, the set of conditions comprises exposure to a temperature below about 1400° C., below about 1200° C., below about 1100° C., below about 1050° C., below about 1000° C., below about 900° C., below about 800° C., below about 700° C., below about 600° C., below about 500° C., below about 400° C., above about 300° C., above about 400° C., above about 500° C., above about 600° C., above about 700° C., above about 800° C., above about 900° C., above about 1000° C., above about 1050° C., or between about 300° C. and about 500° C., between about 300° C. and about 1400° C., between about 300° C. and about 1200° C., between about 300° C. and about 1100° C., between about 300° C. and about 1050° C., between about 300° C. and about 1000° C., between about 300° C. and about 900° C., between about 300° C. and about 500° C., between about 500° C. and about 900° C., between about 500° C. and about 1000° C., between about 500° C. and about 1050° C., between about 500° C. and about 1100° C., between about 500° C. and about 1200° C., or between about 500° C. and about 1200° C. In some embodiments, exposure to a set of conditions comprises performing chemical vapor deposition (CVD) of nanostructures on the basalt, titanium, and/or a catalyst. In some embodiments, the chemical vapor deposition process may comprise a plasma chemical vapor deposition process. Chemical vapor deposition is a process known to those of ordinary skill in the art, and is explained, for example, in Dresselhaus M S, Dresselhaus G., and Avouris, P. eds. "Carbon Nanotubes: Synthesis, Structure, Properties, and Applications" (2001) Springer, which is incorporated herein by reference in its entirety.

In some embodiments, the systems and methods described herein may be used to produce substantially aligned nanostructures. The substantially aligned nanostructures may have sufficient length and/or diameter to enhance the properties of a material when arranged on or within the material. In some embodiments, the set of substantially aligned nanostructures may be formed on a surface of an active growth structure and/or growth substrate, and the nanostructures may be oriented such that the long axes of the nanostructures are substantially non-planar with respect to the surface of the active growth structure and/or growth substrate. In some cases, the long axes of the nanostructures are oriented in a substantially perpendicular direction with respect to the surface of the active growth structure and/or growth substrate, forming a nanostructure array or "forest." The alignment of nanostructures in the nanostructure "forest" may be substantially maintained, even upon subsequent processing (e.g., transfer to other surfaces and/or combining the forests with secondary materials such as polymers), in some embodiments. Systems and methods for producing aligned nanostructures and articles comprising aligned nanostructures are described, for example, in International Patent Application Serial No. PCT/US2007/011914, filed May 18, 2007, entitled "Continuous Process for the Production of Nanostructures Including Nanotubes"; and U.S. Pat. No. 7,537,825, issued on May 26, 2009, entitled "Nano-Engineered Material Architectures: Ultra-Tough Hybrid Nanocomposite System," which are incorporated herein by reference in their entirety.

In some cases, a source of external energy may be coupled with the growth apparatus to provide energy to cause the growth sites to reach the necessary temperature for growth. The source of external energy may provide thermal energy, for example, by resistively heating a wire coil in proximity to the growth sites or by passing a current through a conductive growth substrate. In some cases, the source of external energy may provide an electric and/or magnetic field to the active growth structure and/or growth substrate. In some cases, the source of external energy may provided via magnetron heating, via laser, or via direct, resistive heating the growth substrate, or a combination of one or more of these. In an illustrative embodiment, the set of conditions may comprise the temperature of the active growth structure and/or growth substrate surface, the chemical composition of the atmosphere surrounding the active growth structure and/or growth substrate, the flow and pressure of reactant gas(es) (e.g., carbon-based nanostructure precursors) surrounding the active growth structure and/or substrate surface and within the surrounding atmosphere, the deposition or removal of basalt, titanium, a catalyst, or other materials, on the surface of the growth surface, and/or optionally the rate of motion of the substrate.

In some cases, the nanostructures may be removed from an active growth structure and/or growth substrate after the nanostructures are formed. For example, the act of removing may comprise transferring the nanostructures directly from the surface of the active growth structure and/or growth substrate to a surface of a receiving substrate. The receiving substrate may be, for example, a polymer material or a carbon fiber material. In some cases, the receiving substrate comprises a polymer material, metal, or a fiber comprising $Al_2O_3$, $SiO_2$, carbon, or a polymer material. In some cases, the receiving substrate comprises a fiber comprising $Al_2O_3$, $SiO_2$, carbon, or a polymer material. In some embodiments, the receiving substrate is a fiber weave.

Removal of the nanostructures may comprise application of a mechanical tool, mechanical or ultrasonic vibration, a chemical reagent, heat, or other sources of external energy, to the nanostructures and/or the surface of the active growth structure and/or growth substrate. In some cases, the nanostructures may be removed by application of compressed gas, for example. In some cases, the nanostructures may be removed (e.g., detached) and collected in bulk, without attaching the nanostructures to a receiving substrate, and the nanostructures may remain in their original or "as-grown" orientation and conformation (e.g., in an aligned "forest") following removal from the growth substrate. Systems and methods for removing nanostructures from a substrate, or for transferring nanostructures from a first substrate to a second substrate, are described in International Patent Application Serial No. PCT/US2007/011914, filed May 18, 2007, entitled "Continuous Process for the Production of Nanostructures Including Nanotubes," which is incorporated herein by reference in its entirety.

As used herein, the term "metal" includes the following elements: lithium, sodium, potassium, rubidium, cesium, francium, beryllium, magnesium, calcium, strontium, barium, radium, zinc, molybdenum, cadmium, scandium, titanium, vanadium, chromium, manganese, iron, cobalt, nickel, copper, yttrium, zirconium, niobium, technetium, ruthenium, rhodium, palladium, silver, hafnium, tantalum, tungsten, rhenium, osmium, iridium, platinum, gold, mercury, rutherfordium, dubnium, seaborgium, bohrium, hassium, meitnerium, darmstadtium, roentgenium, ununbium, aluminium, gallium, indium, tin, thallium, lead, bismuth, ununtrium, ununquadium, ununpentium, ununhexium, lanthanum, cerium, praseodymium, neodymium, promethium, samarium, europium, gadolinium, terbium, dysprosium, holmium, erbium, thulium, ytterbium, lutetium, actinium, thorium, protactinium, uranium, neptunium, plutonium, americium, curium, berkelium, californium, einsteinium, fermium, mendelevium, nobelium, and lawrencium.

The term "metalloid," as used herein, includes the following elements: boron, silicon, germanium, arsenic, antimony, tellurium, and polonium.

As used herein, the term "non-metal" includes the following elements: hydrogen, carbon, nitrogen, phosphorous, oxygen, sulfur, selenium, fluorine, chlorine, bromine, iodine, astatine, helium, neon, argon, krypton, xenon, and radon, and ununoctium.

The following documents are incorporated herein by reference in their entirety for all purposes: International Patent Application Serial No. PCT/US2007/011914, filed May 18, 2007, entitled "Continuous Process for the Production of Nanostructures Including Nanotubes," published as WO 2007/136755 on Nov. 29, 2007; International Patent Application Serial No. PCT/US07/11913, filed May 18, 2007, entitled "Nanostructure-reinforced Composite Articles and Methods," published as WO 2008/054541 on May 8, 2008; International Patent Application Serial No. PCT/US2008/009996, filed Aug. 22, 2008, entitled "Nanostructure-reinforced Composite Articles and Methods," published as WO 2009/029218 on Mar. 5, 2009; U.S. Pat. No. 7,537,825, issued on May 26, 2009, entitled "Nano-Engineered Material Architectures: Ultra-Tough Hybrid Nanocomposite System;" U.S. patent application Ser. No. 11/895,621, filed Aug. 24, 2007, entitled "Nanostructure-Reinforced Composite Articles," published as U.S. Patent Application Publication No. 2008/0075954 on Mar. 27, 2008; U.S. patent application Ser. No. 12/618,203, filed Nov. 13, 2009, entitled "Controlled-Orientation Films and Nanocomposites Including Nanotubes or Other Nanostructures;" U.S. patent application Ser. No. 12/630,289, filed Dec. 3, 2009, entitled "Multifunctional Composites Based on Coated Nanostructures;" U.S. patent application Ser. No. 12/847,905, filed on Jul. 30, 2010, and entitled "Systems and Methods Related to the Formation of Carbon-Based Nanostructures," by Steiner et al; and U.S. Provisional Patent Application Ser. No. 61/407,776, filed Oct. 28, 2010, and entitled "Carbon-Based Nanostructure Formation Using Large Scale Active Growth Substrates." All other patents, patent applications, and documents cited herein are also hereby incorporated by reference in their entirety for all purposes.

The following examples are intended to illustrate certain embodiments of the present invention, but do not exemplify the full scope of the invention.

EXAMPLE 1

This example describes the growth of carbon-based nanostructures on a large scale basalt fiber, without the addition of any catalyst. In addition, glass fibers were used as nanostructure growth substrates for comparison purposes.

The basalt fibers used in this example were manufactured by Sudaglass. The characteristics of the basalt fibers were approximately as follows: density=2.75 g/cm$^3$, E=89 GPa, strength=4849 MPa, diameter=9-23 µm, melting temperature=1450° C. A basalt fiber was chemically analyzed using energy dispersive X-ray spectroscopy. The chemical composition of the basalt fiber is shown in Table 1 below.

TABLE 1

Chemical composition of the basalt fibers tested in this Example

| Component | Weight % | Standard Deviation |
| --- | --- | --- |
| $SiO_2$ | 54.2 | 2.0 |
| $Al_2O_3$ | 8.6 | 0.4 |
| $Fe_2O_3$ | 9.6 | 7.2 |
| MgO | 7.6 | 0.1 |
| CaO | 12.3 | 2.1 |
| $Na_2O$ | 3.3 | 0.2 |
| $K_2O$ | 2.6 | 0.7 |
| $TiO_2$ | 1.7 | 2.1 |

The glass fibers used in this example were manufactured by Owens-Corning Corp. The properties of the glass fiber were approximately as follows: density=2.5-2.6 g/cm$^3$, E=60-80 GPa, strength=1900-3600 MPa, diameter=9-13 µm, melting temperature=1120° C.

A thread of fiber (either basalt or glass fiber) was washed with acetone overnight, and then treated in an oven using a standard CVD process, stabilizing the temperature at 350° C. for 15 minutes under an $H_2$/He atmosphere. Nanostructures were then grown at 750° C. for 5 minutes under $C_2H_4/H_2$/He. Both samples (basalt and glass fiber) were analyzed by scanning electron microscopy after nanostructure growth. In case of the glass fiber, the surface of the fiber was substantially completely clean, similar to a raw glass fiber surface; substantially no carbonaceous species were on the surface. On the other hand, carbon nanotubes and some carbon nanofibers of larger diameter were observed on the basalt fiber, as shown in FIGS. 4A-4B.

The same experiment was repeated using a dip coating process to deposit a catalyst on the surface of each fiber of the thread. A thread (of basalt or glass fiber) was washed with acetone overnight, and was then dipped in a solution of iron nitrate/isopropanol. Once the thread was dried, it was treated in an furnace using the same recipe indicated above (heated to a temperature of 350° C. for 15 minutes under an $H_2$/He atmosphere, then exposed to $C_2H_4/H_2$/He at for 5 minutes for growth). In this set of experiments, the nanostructure growth temperature was modified in order to study the effect of the growth temperature on the resulting nanostructures and growth substrate.

Figure 5A:
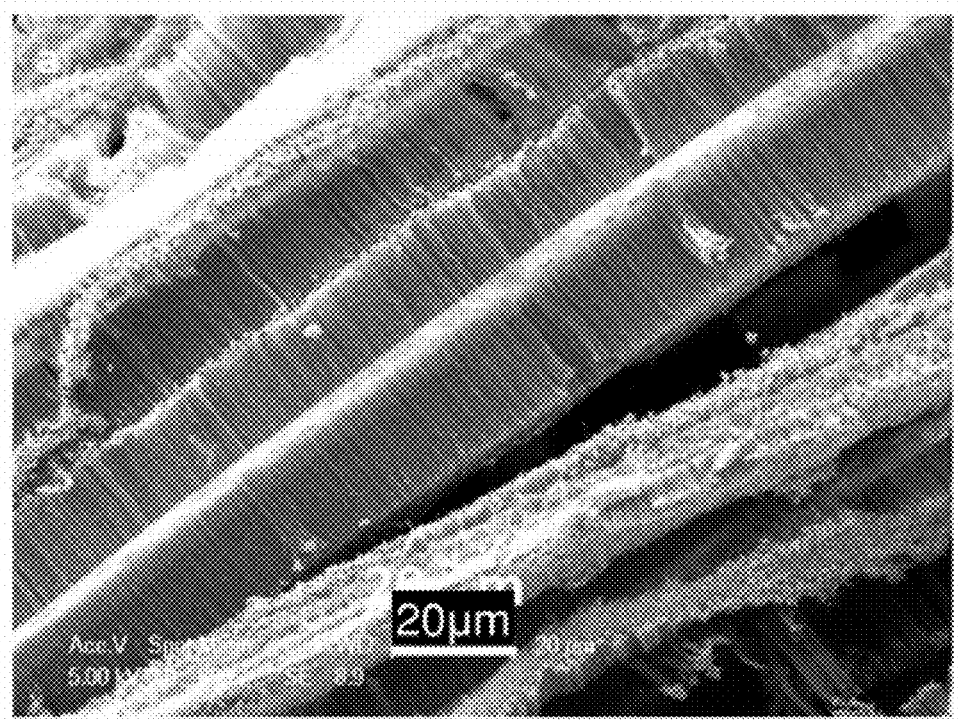
FIGS. 5A-5B are, according to some embodiments, exemplary scanning electron microscope images of (A) glass fibers exposed to conditions for nanostructure growth and (B) nanostructure growth on basalt fibers.
Figure 5B:
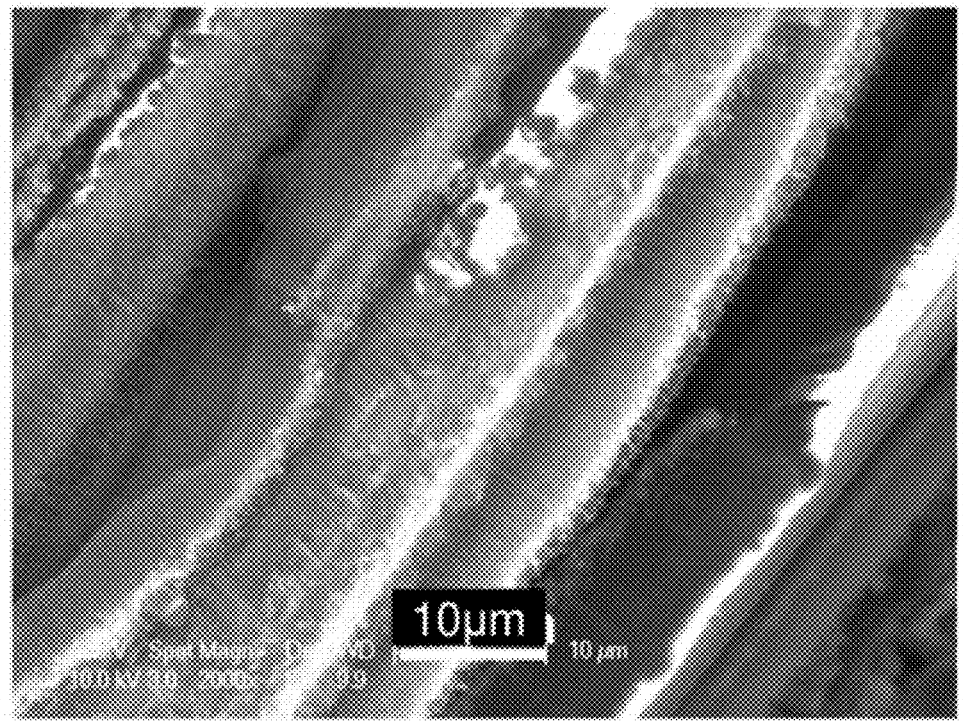

When auxiliary catalysts were used, dense aligned carbon nanotubes were grown successfully at growth temperatures over 650° C. around substantially every filament. The morphology of the fibers and nanostructures was analyzed using scanning electron microscopy. Growth on the glass fibers is shown in the image in FIG. 5A, and growth on the basalt fibers is shown in the image in FIG. 5B. No substantial differences were observed in nanostructure length or quality of sample homogeneity for both glass and basalt.

Single fiber tests were also performed to characterize the mechanical properties of the glass and basalt fibers after nanostructure growth using auxiliary catalyst.

Figure 6A:
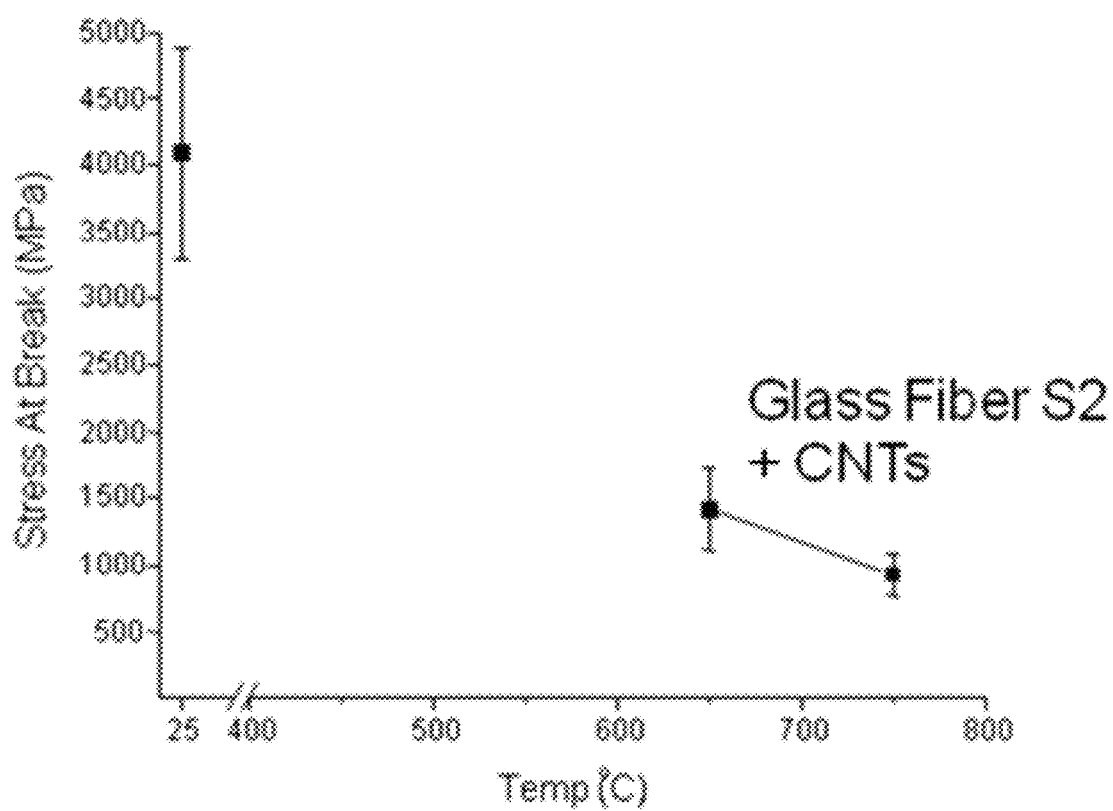
FIGS. 6A-6B are exemplary plots of (A) breaking stress as a function of nanostructure growth temperature and (B) modulus as a function of nanostructure growth temperature, for glass fibers exposed to conditions for nanostructure growth, according to certain embodiments.
Figure 6B:
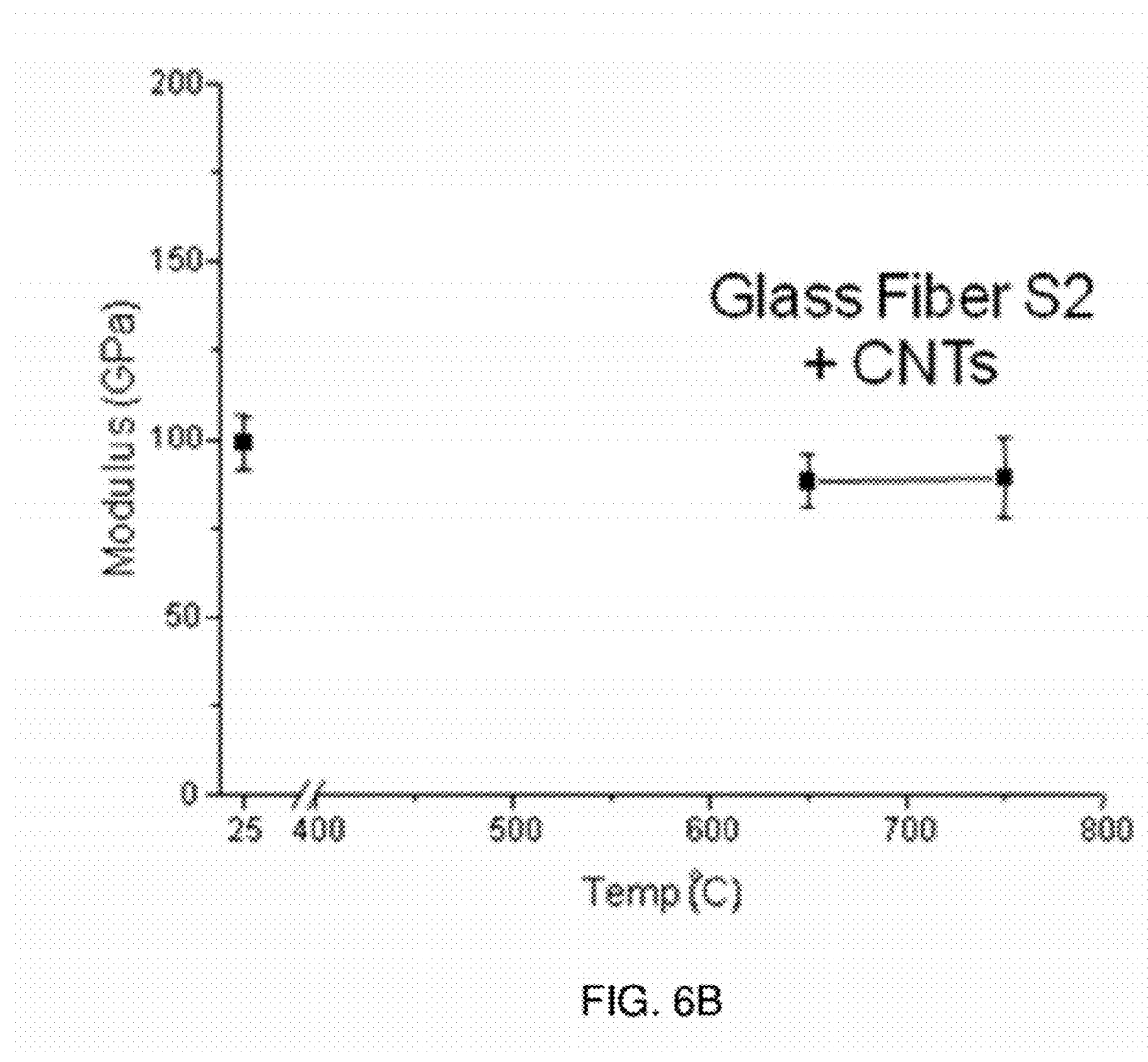

The strengths of the glass fibers after growth were measured for fibers used at various growth temperatures. FIG. 6A includes a plot of the stress at the breaking point of the glass fiber as a function of the growth temperature. As growth temperature was increased from 650° C. to 750° C., the strength of the post-growth glass fibers decreased significantly. In addition, the strength of the post-growth glass fibers was significantly lower than the strength at room temperature (indicated by the point on the far left of the plot). FIG. 6B includes a plot of the modulus of the glass fiber as a function of the growth temperature. The modulus of the post-growth glass fibers remained fairly stable with an increase in growth temperature.

The basalt fibers, on the other hand, remained more stable over the range of growth temperatures tested. Under this set of conditions, carbon nanotubes were only observed at growth temperatures of 650° C. and 750° C.

Figure 7A:
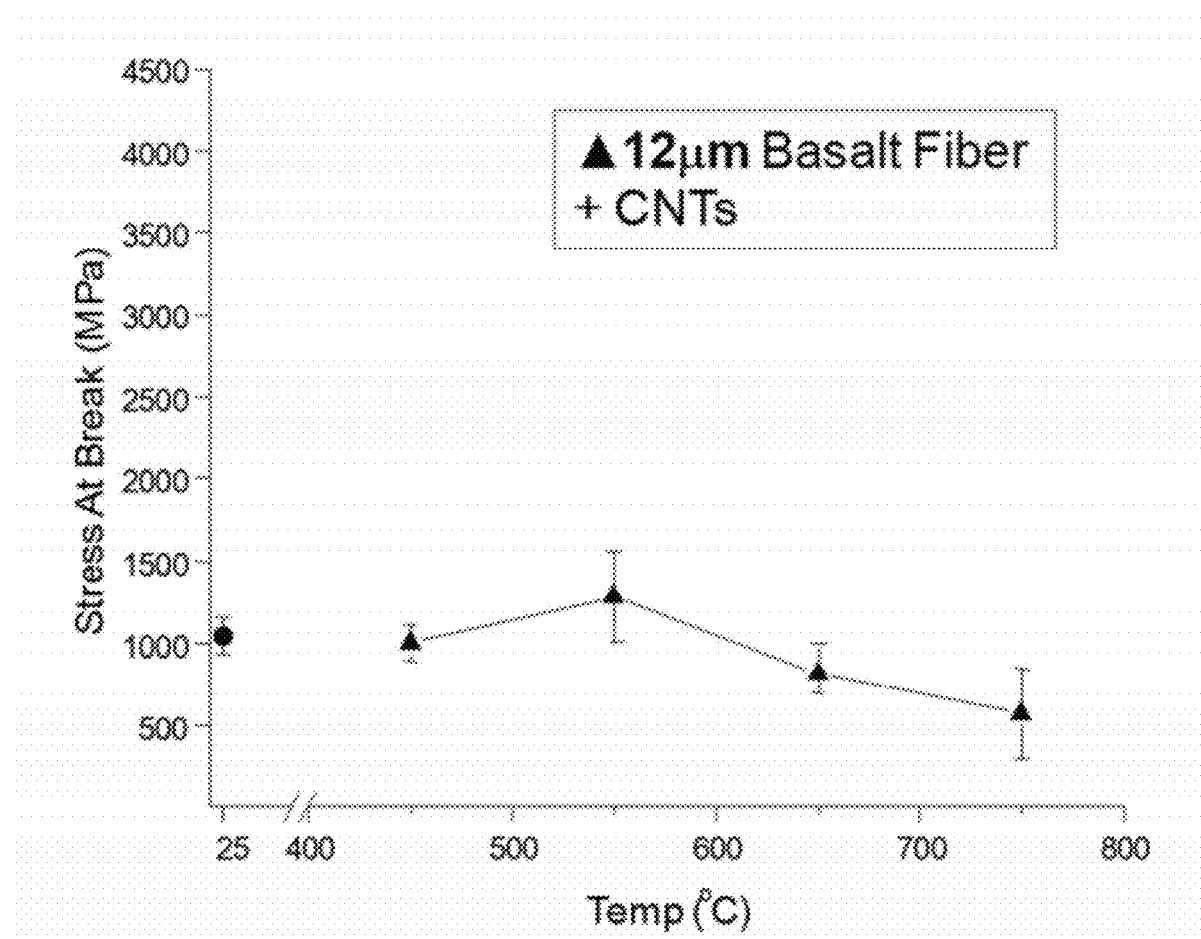
FIGS. 7A-7B are, according to some embodiments, exemplary plots of (A) breaking stress as a function of nanostructure growth temperature and (B) modulus as a function of nanostructure growth temperature, for nanostructure growth on basalt fibers.
Figure 7B:
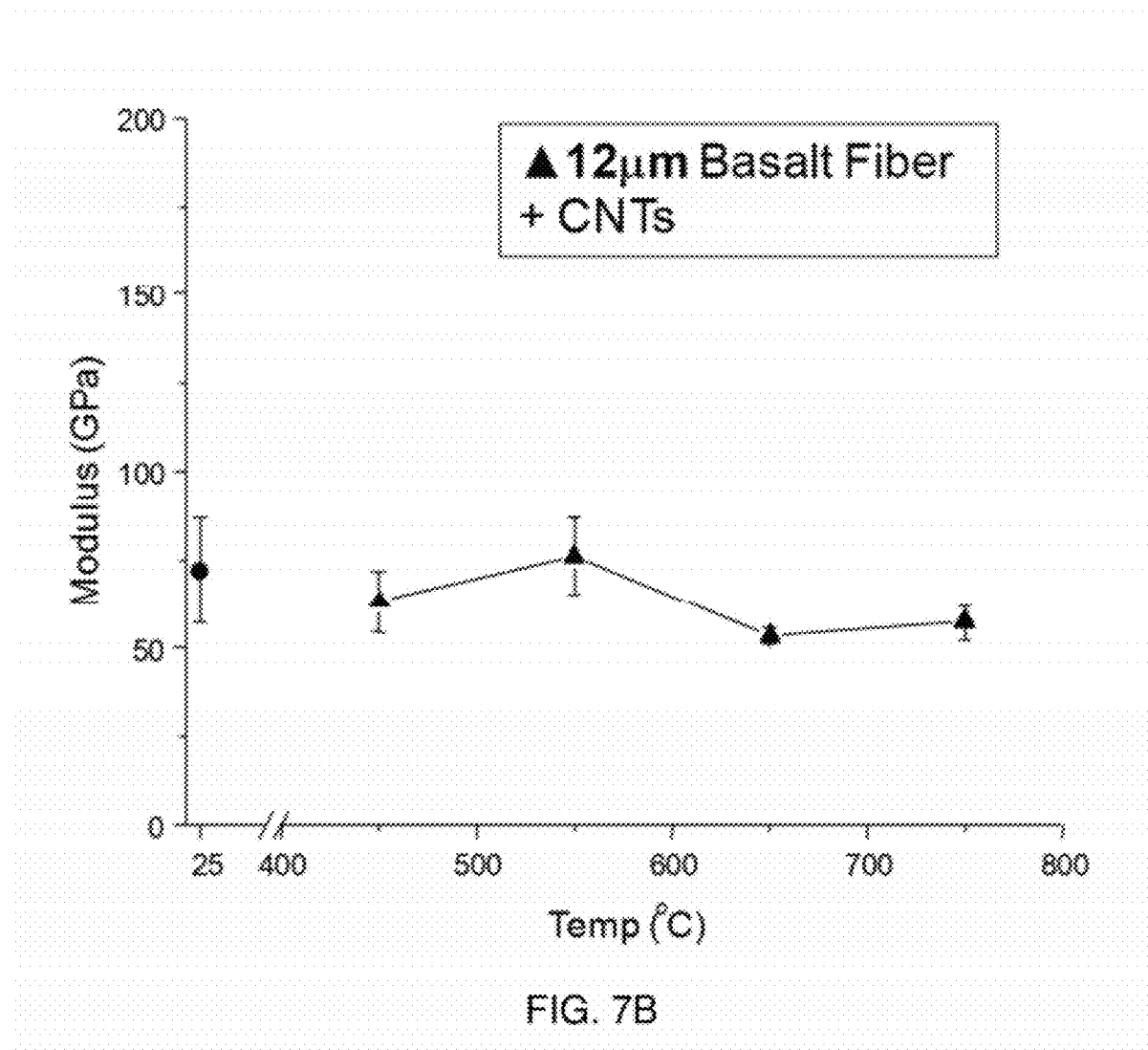

FIG. 7A includes a plot of the stress at the breaking point of the basalt fiber as a function of the growth temperature. The breaking stress remained fairly constant over the range of growth temperatures tested. In addition, the breaking stresses at temperatures over 450° C. were close to the breaking stress at room temperature (indicated by the point at the far left of the plot. FIG. 7B includes a plot of the modulus of the basalt fiber as a function of the growth temperature. The modulus of the basalt fiber changed only slightly with a change in growth temperature.

EXAMPLE 2

Figure 8:
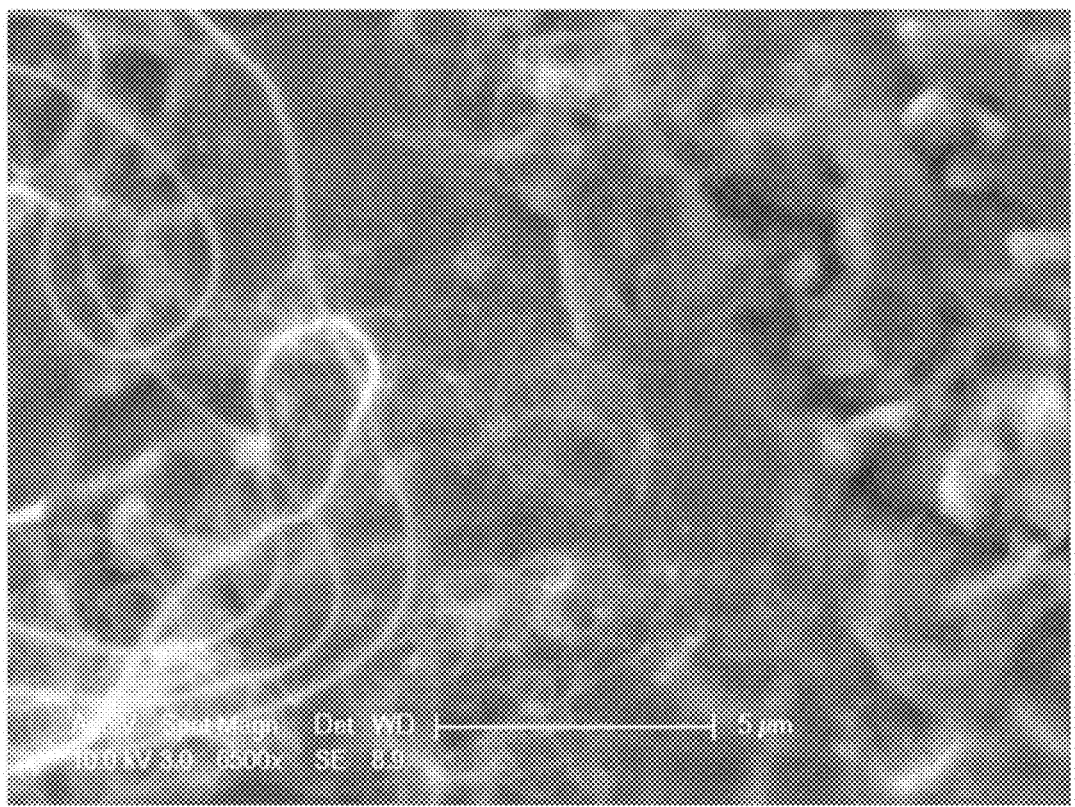
FIG. 8 is an exemplary micrograph of carbon-based nanostructures grown on a titanium active growth structure, according to one set of embodiments.

This example describes an exemplary process for growing carbon nanotubes on a titanium substrate in the absence of an auxiliary catalyst. A titanium plate of about 1 mm thickness cut in squares of 1 cm$^2$ was used as a substrate. The titanium plate was cleaned with acetone and isopropanol and dried overnight. No catalyst was applied to the titanium. The titanium substrate was introduced into a furnace where a chemical vapour deposition (CVD) process was performed. The first step of the CVD process involved treating the sample at 750° C. for 5 minutes under an H$_2$/He atmosphere. Nanostructures were then grown at 750° C. for 5 minutes under C$_2$H$_4$/H$_2$/He. The sample was analyzed by scanning electron microscopy after nanostructure growth. Carbon nanotubes and what appeared to be carbon nanofibers of larger diameter were observed on the titanium substrate, as shown in FIG. 8.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of growing carbon-based nanostructures, comprising:
    exposing an active growth structure having a first cross-sectional dimension of at least about 1 mm to a carbon-based nanostructure precursor under conditions causing the formation of carbon-based nanostructures directly on the active growth structure, wherein:
    the carbon-based nanostructures comprise at least one of carbon nanotubes, carbon nanofibers, and carbon nanowires, and
    the active growth structure comprises a mixture of metal powders that have been sintered together to form a single, standalone structure.

2. A method as in claim 1, wherein the formation of the carbon-based nanostructures occurs in the absence of a catalyst auxiliary to the active growth structure.

3. A method as in claim 1, wherein the active growth structure has a second cross-sectional dimension orthogonal to the first cross-sectional dimension, wherein the second cross-sectional dimension is at least about 1 mm.

4. A method as in claim 1, wherein the active growth structure has a minimum cross-sectional dimension of at least about 1 mm.

5. A method as in claim 1, wherein the active growth structure comprises basalt.

6. A method as in claim 1, wherein the active growth structure comprises an elemental metal.

7. A method as in claim 1, wherein the active growth structure comprises a metal alloy.

8. A method as in claim 1, wherein the active growth structure comprises elemental titanium.

9. A method as in claim 1, wherein the active growth structure comprises at least one of a wafer, a fiber, a tow of fibers, and a weave.

10. A method as in claim 9, wherein the active growth structure comprises a fiber.

11. A method of growing carbon-based nanostructures, comprising:
    exposing an active growth structure comprising basalt to a carbon-based nanostructure precursor under conditions causing the formation of carbon-based nanostructures on the basalt,
    wherein the carbon-based nanostructures comprise at least one of carbon nanotubes, carbon nanofibers, and carbon nanowires,
    wherein the basalt is in contact with a non-basalt growth substrate material, and
    wherein the non-basalt growth substrate material comprises at least one of amorphous carbon, carbon aerogel, carbon fiber, graphite, glassy carbon, carbon-carbon composite, graphene, aggregated diamond nanorods, nanodiamond, and diamond.

12. A method as in claim 1, wherein the carbon-based nanostructures comprise carbon nanotubes.

13. A method as in claim 11, wherein exposing the active growth structure comprising basalt to a carbon-based nanostructure precursor comprises exposing a substantially planar active growth structure comprising basalt to the carbon-based nanostructure precursor.

14. A method as in claim 11, wherein exposing the active growth structure comprising basalt to a carbon-based nanostructure precursor comprises exposing a fiber comprising basalt to the carbon-based nanostructure precursor.

15. A method as in claim 11, wherein exposing the active growth structure comprising basalt to a carbon-based nanostructure precursor comprises exposing a particle comprising basalt to the carbon-based nanostructure precursor.

16. A method as in claim 11, wherein exposing the active growth structure comprising basalt to a carbon-based nanostructure precursor comprises exposing a nanoparticle comprising basalt to the carbon-based nanostructure precursor.

17. A method as in claim 11, wherein the exposing step comprises exposing the active growth structure comprising basalt to a carbon-based nanostructure precursor such that the precursor contacts the basalt.

18. A method as in claim 1, wherein the carbon-based nanostructure precursor comprises at least one of a hydrocarbon and an alcohol.

19. A method as in claim 1, wherein the conditions comprise a pressure substantially equal to or less than about 1 atmosphere.

20. A method as in claim 1, wherein the conditions comprises a temperature between about 300-1400° C.

21. A method as in claim 11, wherein the basalt does not diffuse significantly into or significantly chemically react with the non-basalt substrate material, and the non-basalt substrate material does not significantly diffuse into the basalt during formation of the carbon-based nanostructures.

22. A method as in claim 11, wherein the basalt comprises between about 40 wt % and about 60 wt % $SiO_2$.

23. A method as in claim 11, wherein the basalt comprises between about 1 wt % and about 25 wt % iron oxides.

24. A method as in claim 11, wherein the basalt comprises between about 1 wt % and about 25 wt % $Fe_2O_3$.

25. A method as in claim 11, wherein the basalt comprises between about 1 wt % and about 25 wt % FeO.

26. A method as in claim 11, wherein the basalt comprises between about 5 wt % and about 20 wt % $Al_2O_3$.

27. A method as in claim 11, wherein the basalt comprises between about 4 wt % and about 10 wt % MgO.

28. A method as in claim 11, wherein the basalt comprises between about 5 wt % and about 15 wt % CaO.

29. A method as in claim 11, wherein the basalt comprises between about 1 wt % and about 15 wt % $Na_2O$.

30. A method as in claim 11, wherein exposing the active growth structure comprising basalt to a carbon-based nanostructure precursor causes formation of the carbon-based nanostructures directly on the basalt.

31. A method as in claim 1, wherein long axes of the carbon nanotubes, carbon nanofibers, and/or carbon nanowires are substantially non-planar with respect to a surface of the active growth structure.

32. A method as in claim 31, wherein the long axes of the carbon nanotubes, carbon nanofibers, and/or carbon nanowires are substantially perpendicular to the surface of the active growth structure.

33. A method as in claim 1, wherein long axes of the carbon nanotubes, carbon nanofibers, and/or carbon nanowires are substantially aligned.

34. A method as in claim 11, wherein long axes of the carbon nanotubes, carbon nanofibers, and/or carbon nanowires are substantially non-planar with respect to a surface of the active growth structure comprising basalt.

35. A method as in claim 34, wherein the long axes of the carbon nanotubes, carbon nanofibers, and/or carbon nanowires are substantially perpendicular to the surface of the active growth structure.

36. A method as in claim 11, wherein long axes of the carbon nanotubes, carbon nanofibers, and/or carbon nanowires are substantially aligned.

37. A method as in claim 11, wherein the carbon-based nanostructures comprise carbon nanotubes.

38. A method as in claim 1, wherein the first cross-sectional dimension of the active growth structure is at least about 1 cm.

39. A method of growing carbon-based nanostructures, comprising:
    exposing an active growth structure having a first cross-sectional dimension of at least about 1 mm to a carbon-based nanostructure precursor under conditions causing the formation of carbon-based nanostructures directly on the active growth structure, wherein:
    the carbon-based nanostructures comprise at least one of carbon nanotubes, carbon nanofibers, and carbon nanowires,
    the active growth structure is a single, standalone structure, and
    the carbon-based nanostructure precursor comprises a solid.

40. A method as in claim 39, wherein the formation of the carbon-based nanostructures occurs in the absence of a catalyst auxiliary to the active growth structure.

41. A method as in claim 39, wherein the active growth structure has a second cross-sectional dimension orthogonal to the first cross-sectional dimension, wherein the second cross-sectional dimension is at least about 1 mm.

42. A method as in claim 39, wherein the active growth structure has a minimum cross-sectional dimension of at least about 1 mm.

43. A method as in claim 39, wherein the active growth structure comprises basalt.

44. A method as in claim 39, wherein the active growth structure comprises an elemental metal.

45. A method as in claim 39, wherein the active growth structure comprises a metal alloy.

46. A method as in claim 39, wherein the active growth structure comprises elemental titanium.

47. A method as in claim 39, wherein the active growth structure comprises at least one of a wafer, a fiber, a tow of fibers, and a weave.

48. A method as in claim 47, wherein the active growth structure comprises a fiber.

49. A method as in claim 39, wherein the carbon-based nanostructure precursor comprises at least one of a hydrocarbon and an alcohol.

50. A method of growing carbon-based nanostructures, comprising:
    exposing an active growth structure having a first cross-sectional dimension of at least about 1 mm to a carbon-based nanostructure precursor under conditions causing the formation of carbon-based nanostructures directly on the active growth structure, wherein:
    the carbon-based nanostructures comprise at least one of carbon nanotubes, carbon nanofibers, and carbon nanowires,
    the active growth structure is a single, standalone structure, and
    the carbon-based nanostructure precursor comprises at least one of coal, coke, amorphous carbon, unpyrolyzed organic polymers, partially pyrolyzed organic polymers, diamond, and graphite.

51. A method as in claim 50, wherein the formation of the carbon-based nanostructures occurs in the absence of a catalyst auxiliary to the active growth structure.

52. A method as in claim 50, wherein the active growth structure has a second cross-sectional dimension orthogonal to the first cross-sectional dimension, wherein the second cross-sectional dimension is at least about 1 mm.

53. A method as in claim 50, wherein the active growth structure has a minimum cross-sectional dimension of at least about 1 mm.

54. A method as in claim 50, wherein the active growth structure comprises basalt.

55. A method as in claim 50, wherein the active growth structure comprises an elemental metal.

56. A method as in claim 50, wherein the active growth structure comprises a metal alloy.

57. A method as in claim 50, wherein the active growth structure comprises elemental titanium.

58. A method as in claim 50, wherein the active growth structure comprises at least one of a wafer, a fiber, a tow of fibers, and a weave.

59. A method as in claim 58, wherein the active growth structure comprises a fiber.

60. A method as in claim 50, wherein the carbon-based nanostructure precursor comprises at least one of a hydrocarbon and an alcohol.

* * * * *